(12) United States Patent
Cline et al.

(10) Patent No.: US 8,072,999 B1
(45) Date of Patent: Dec. 6, 2011

(54) METHOD AND SYSTEM FOR REMOVING AND RETURNING NODES IN A SYNCHRONOUS NETWORK

(75) Inventors: David Cline, Santa Barbara, CA (US); Judy Anne Mitchell, Goleta, CA (US); Robert Pearce, Bristol (GB)

(73) Assignee: Motion Engineering Inc., Santa Barbara, CA (US)

( * ) Notice: Subject to any disclaimer, the term of this patent is extended or adjusted under 35 U.S.C. 154(b) by 112 days.

(21) Appl. No.: 12/114,873

(22) Filed: May 5, 2008

Related U.S. Application Data

(60) Provisional application No. 60/916,694, filed on May 8, 2007.

(51) Int. Cl.
*H04L 12/28* (2006.01)

(52) U.S. Cl. ......... 370/431; 370/443; 370/458; 370/459

(58) Field of Classification Search ........... 370/445, 370/447, 448, 458, 462, 442, 241, 248, 252, 370/443, 441, 437, 468, 431, 459
See application file for complete search history.

(56) References Cited

U.S. PATENT DOCUMENTS

| | | | | | |
|---|---|---|---|---|---|
| 5,173,898 | A | * | 12/1992 | Heinzmann et al. | 370/440 |
| 5,465,251 | A | * | 11/1995 | Judd et al. | 370/351 |
| 6,320,871 | B1 | * | 11/2001 | Mizuguchi et al. | 370/452 |
| 6,507,592 | B1 | * | 1/2003 | Hurvig et al. | 370/503 |
| 7,024,257 | B2 | | 4/2006 | Pearce et al. | |
| 7,143,301 | B2 | | 11/2006 | Pearce et al. | |
| 7,212,540 | B2 | * | 5/2007 | Unitt et al. | 370/452 |
| 7,411,919 | B2 | * | 8/2008 | Tavli et al. | 370/315 |
| 7,426,190 | B2 | * | 9/2008 | Manjeshwar et al. | 370/254 |
| 7,453,816 | B2 | * | 11/2008 | Fields et al. | 370/241 |
| 7,460,553 | B2 | * | 12/2008 | Riveiro Insua et al. | 370/437 |
| 7,613,204 | B2 | * | 11/2009 | Matsunaga et al. | 370/445 |
| 2002/0163695 | A1 | * | 11/2002 | Unitt et al. | 359/137 |
| 2004/0136393 | A1 | * | 7/2004 | Riveiro Insua et al. | 370/432 |
| 2006/0212604 | A1 | | 9/2006 | Beckhoff et al. | |

* cited by examiner

*Primary Examiner* — Chuong T Ho
(74) *Attorney, Agent, or Firm* — Christine Q. McLeod; Beusse Wolter Sanks Mora & Maire, P.A.

(57) ABSTRACT

A method and system for adding a node into a network operating in a cyclic state after one or more nodes have been previously removed without interrupting the synchronous traffic of the remaining nodes on the network is provided. The method includes discovering an added node by sending data to the added node in a downstream timeslot previously assigned to a removed node, the data having a delay value for scheduling a response from the added node to coincide with an upstream timeslot previously assigned to the removed node, thereby avoiding collisions with the synchronous traffic on the network; receiving the response from the added node; configuring the added node in accordance with an original configuration of the removed node; and commencing cyclic operation of the added node.

29 Claims, 25 Drawing Sheets

METHOD AND SYSTEM FOR REMOVING AND RETURNING NODES IN A SYNCHRONOUS NETWORK

RELATED APPLICATIONS

This application claims the benefit of U.S. Provisional Application Ser. No. 60/916,694, filed on May 8, 2007, which is hereby incorporated by reference in its entirety.

BACKGROUND OF THE INVENTION

1. Field of the Invention

This invention relates to networked systems, and specifically to an improved system, method, and computer-readable instructions for removing and returning nodes to a synchronous network.

2. Discussion of the Background

In high-performance automated machinery or plant there is a need for synchronous acquisition of measurements from networked sensors and for synchronous application of setpoint values to networked actuators as this allows coordinated control and measurement. The synchronous measurement and synchronous application also permits loop closure via the network. The synchronous transfer of data to and from a central controller, and the necessity of establishing and maintaining synchronized clocks at each of the network slaves make special requirements on the network used in such a system; and although it is to some extent possible to use general purpose networks in such systems (See ANSI/IEEE Std 802.3 "CSMA/CD Access Method and Physical Layer Specifications" and BS EN 50325-4:2002 "Industrial communication subsystem based on ISO 11898 (CAN) for controller-device interfaces. CANopen"), it is advantageous for both cost and performance reasons to use special purpose, "real-time, cyclic networks", that have been devised specifically for this purpose.

The defining characteristic of a real-time, cyclic network (hereafter abbreviated to "cyclic network") is that, when the network is in its operational state, both "downstream" (from the controller) and "upstream" (to the controller) packets are scheduled according to a repeating timetable. The simplest scheme would be to send one downstream packet to each slave node per cycle (or alternatively one, composite packet to all slaves) and to receive one upstream packet from each slave node per cycle. There are many variations on this communication scheme, it is commonplace for the controller to emit a packet specifically for network timing purposes that is broadcast to all of the nodes, similarly it is possible to exchange more than one packet between the controller and each node on a cyclic basis. The period of the communication cycle is determined by software and hardware on the controller during network configuration and remains fixed during the operational phase of network operation. In general, shorter cycle times provide better control and therefore in a high-performance system there may be little or no idle network time.

In order to keep the terminology simple and consistent herein, the node that is responsible for configuring, controlling and supervising the network, i.e., the network master, will be referred to as the 'controller' because in most practical systems this is the element that is also responsible for overall system control. Again, for the sake of brevity, the remaining nodes on the network will be referred to simply as 'nodes' rather than slave nodes. The network is intended to carry out control or measurement or both on a machine, instrument or plant; to avoid repetition 'control' will embrace measurement and 'system' will be the network and that which is connected to it. Finally, communication with the network will be described as being carried in 'packets' in preference to the many alternative terms.

Cyclic networks provide cost-effective, high-performance control in many machines today. However in such networks the system must remain unchanged after the network has been initialized and brought into its cyclic, operational state. In general, it is not possible to add new nodes to an operational network, as would be advantageous in a machine that has modular structure where the modules can be brought into commission serially. Similarly it is not possible to remove a node and replace it while the network remains in its operational phase. In both cases, the machine would have to cease operation, the new nodes would then be added or replaced and the network would then have to be brought back into operation.

Therefore, there is a need in the art for a method and system that extends the capability of many cyclic networks so that it is possible to add nodes to an operational cyclic network, or to replace nodes within an operational cyclic network. This capability is often referred to in the literature as 'dynamic removal and attachment' or 'hot-plugging'. The term 'hot-replace' may be used to cover the more restrictive case where nodes can be removed and subsequently re-attached or replaced but only up to the composition of the original set of nodes on the network.

There are a number of problems and limitations of the prior art due to two main pre-requisites to the implementation of hot-plugging on a cyclic network. The first would be to ensure that a physical communication link remains with all nodes while a node or group of nodes is being removed. The second would be to ensure that, when a node (or group of nodes) is added to the network, the packets sent from the node(s) to the controller do not disrupt existing network traffic.

Ethercat™ (See IEC PAS 62407 First edition 2005-06 Real-time Ethernet control automation technology (EtherCAT™), and U.S. Patent Pending Publication US2006/0212604A1 "Coupler for a ring topology network and an Ethernet-based network") is a network that claims to support a form of hot-plugging, although the details of which have not been fully disclosed. Ethercat uses a logical ring topology, which is implemented as a physical line. Communication over this network is by means of a controller-initiated packet, which is modified on-the-fly by receiving nodes before being returned in this modified form to the controller. It is reasonable to infer, on the basis of the available information, that a node can discern when a neighboring node has been removed and can therefore automatically loop-back and likewise that said node can discern when a neighboring node has been attached and can therefore automatically change from loop-back to pass-through. Thus a node could be added to or removed from the end of a line of nodes with no or at least only temporary disruption to the circulating packet. As all packets are controller-initiated and modified by the nodes on-the-fly, there are no considerations of the timing of the reply packets since there are no such packets. Ethercat therefore offers a potential means of realizing the two main pre-requisites to the implementation of hot-plugging, however the solution is restricted both topologically (i.e., it only works where nodes are added or removed from the end of a line of nodes) and to a particular system of signaling (i.e., controller-initiated packets that are modified on-the-fly). Therefore, there still remains a need in the art for a system and method that escapes both of these limitations and is of more general applicability.

All other known examples of networks in the prior art have traffic organized so that, each communication cycle comprises one or more packets sent by the controller to the nodes and with one or more packets sent from each node to the controller.

In a cyclic network realized as a ring with unidirectional links, such as the typical embodiment of IEC61491 (IEC61491-2002 "Adjustable Speed Electric Drive Systems Incorporating Semiconductor Power Converters" (SERCOS™)), if a node or a group of nodes or any link is removed then communication fails either because packets emitted by the controller can not reach any of the nodes or because packets from some or all of the nodes can not reach the controller. In such a network, the reduced set of nodes can only be communicated with by re-wiring the remaining nodes into a ring and re-initializing the network.

In a cyclic network realized as a half-duplex or full-duplex bus, e.g., an alternative embodiment of IEC61491 using RS-485 (SERCON410B Datasheet© 1994 SGS-THOMSON), if a node or group of nodes is disconnected, it remains possible to communicate with the remaining nodes. However the problem remains of ensuring that, when nodes are added to the network, the packets that they send to the controller do not collide with existing network traffic.

In a cyclic network realized using hubs, e.g., Powerlink, if a node or group of nodes is disconnected it remains possible to communicate with the remaining nodes. Again the problem remains of ensuring that, when nodes are added to the network, the packets that they send to the controller do not collide with existing network traffic.

SynqNet® (See U.S. Pat. No. 7,024,257, U.S. Pat. No. 7,143,301) and also SERCOS™ III are full-duplex, cyclic networks that can be wired either as a line or as a ring. When a node or group of nodes is removed from the ring, the controller maintains full communication with the remaining nodes; this is termed 'self-healing'. In both cases the problem remains of ensuring that, when nodes are added to the network, the packets that they send to the controller do not collide with existing network traffic.

Several networks support a mixture of cyclic and acyclic communication; typically each communication cyclic is divided into one or more time-slots reserved for scheduled, cyclic packets and one or more time-slots reserved for acyclic traffic types (hereinafter referred to herein as 'asynchronous time-slots'). Example networks include SERCOS™ III, USB (Universal Serial Bus Specification Revision 2.0) and Powerlink (IEC PAS 62408 First edition 2005-06 Real-time Ethernet Powerlink (EPL)). In such networks it is possible to ensure that a node, which has been added to the network, at first communicates only during an asynchronous time-slot and thus does not disrupt exiting cyclic traffic; one method is for the node to reply to polled packets from the controller and another method is for the node to signal its presence by an event packet confined to an asynchronous time-slot. There are restrictions imposed by such schemes however. The first restriction is the necessity to reserve an asynchronous time-slot—at the expense of cyclic traffic. The second restriction is that the node must have some knowledge about where the time-slot is in time—typically this implies respecting a static timing restriction on when the node can send its reply or event packet with respect to a cyclic timing reference such as a timing packet—which may be operationally inconvenient. Accordingly, there is a need in the art to dispense with both of these restrictions. There is a need to avoid altogether the complication of having mixed traffic types and yet still ensures that when nodes are added to the network, the packets that they send to the controller do not disrupt existing network.

SUMMARY OF THE INVENTION

Accordingly, it is an object of this invention to provide a system, method, and computer-readable instructions for removing and returning nodes to a synchronous network. The invention provides a method and system for adding a node into a network operating in a cyclic state after one or more nodes have been previously removed without interrupting the synchronous traffic of the remaining nodes on the network. The method and system include discovering an added node by sending data to the added node in a downstream timeslot previously assigned to a removed node, the data having a delay value for scheduling a response from the added node to coincide with an upstream timeslot previously assigned to the removed node, thereby avoiding collisions with the synchronous traffic on the network. After receiving the response from the added node, the added node is configured in accordance with an original configuration of the removed node and the cyclic operation of the added node can then be commenced.

The invention can be implemented in numerous ways, including as a system, a device, a method, or a computer readable medium. Several embodiments of the invention are discussed below.

In an embodiment, the invention comprises a method for adding a node into a network operating in a cyclic state without interrupting the synchronous traffic of on the network, comprising: (a) discovering an added node by sending data to the added node in a downstream timeslot previously assigned for sending data to the added node, said data comprising a delay value for scheduling a response from the added node to coincide with an upstream timeslot known to be unused, thereby avoiding collisions with the synchronous traffic on the network; (b) receiving the response from the added node; (c) configuring the added node in accordance with a previously calculated configuration (such as an original configuration of a removed node or nodes or a configuration previously determined for a slot/location in which a node or nodes will be added); and (d) commencing cyclic operation of the added node. In this example, up to N added nodes can be discovered sequentially to fill all of the cyclic timeslots reserved for those nodes in the original network plan. Generally, the N added nodes are discovered sequentially until a final link is discovered when a response is not received. Moreover, the remaining nodes on the network are configured for synchronized transfer of data according to a repeating timetable and the added node is configured according to an original schedule of the removed node (or of the reserved slot/location in which a node or nodes will be added) in that timetable. In an embodiment, the added node comprises the substantially the same node type, node sequence, and cable length of a node that has previously been removed from the network.

When discovering the added node, the method comprises sending data to an address designed to elicit a response only from a node in an undiscovered state. A further embodiment comprises wherein N nodes are first removed from the network and subsequently up to N are re-attached to the network. Further, the re-attachment of the nodes may be accomplished in several stages.

In an embodiment, the delay value for scheduling the response from the added node is used by an asynchronous delay timer in the network node logic of the added node such that the added node will send its response back within the respective timeslot of the originally calculated cyclic schedule for the previously removed node. The delay value may be calculated based information associated with network schedule, node type, internal node delay, and cable length of the one or more nodes that have been previously removed.

In a further embodiment, the invention includes sending a set of commands to shutdown one or more nodes prior to removal of said one or more nodes to address safety factors and network errors. It also includes self-healing of the network after removal of the one or more nodes. Further embodiments include routing traffic on the network across formerly idle cables as part of said self-healing.

In an embodiment, discovering the added node begins from port A of the controller. Alternately, discovering the added node begins from port B of the controller. Moreover, configuring the added node may be in accordance with the configuration for that node contained in the original network plan. Discovering an added node continues for all added nodes up to the complement of the original plan of the network. Configuring the added node in accordance with the original configuration of the removed node comprises assigning the added node the network address of the previously removed node.

The network may operate as a half-duplex cyclic network or a full-duplex cyclic network. Alternately, the network may comprise a topology that allows for the network traffic to continue without disruption when a node or group of nodes are removed. Moreover, the network may comprise one or more of a ring topology, a bus topology, a line topology, a tree topology, or a hybrid topology. The network traffic signaling may be based on one or more of RS485, RS422, LVDS, 10-base-T, 100-base-T, 1000-base-T, 100-base-F, or wireless.

The invention may also a computer readable medium storing instructions for execution on a computer system, which when executed by a computer system causes the computer system to perform the methods described herein. The invention may also comprise a system with components that utilize computer instructions that cause the system to perform the methods described herein.

A further embodiment includes a motion control system comprising: a network; and a central controller and plurality of slaves communicating with each other via said network wherein each of the plurality of slaves on the network comprise a delay timer for scheduling a response according to a delay value; and wherein the central controller comprises capability for discovering an added node by sending data to the added node in a downstream timeslot previously assigned for that purpose, said data comprising the delay value for scheduling a response from the added node to coincide with an upstream timeslot previously assigned for that purpose, thereby avoiding collisions with the synchronous traffic on the network; for receiving the response from the added node; for configuring the added node in accordance with previously calculated configuration; and for commencing cyclic operation of the added node. The downstream timeslot previously assigned and the upstream timeslot previously assigned may correspond to the timeslots of a removed node.

A still further embodiment comprises a network allowing for the addition of a node into a network operating in a cyclic state without interrupting the synchronous traffic of the exiting nodes on the network, comprising: a plurality of nodes on the network, each comprising a delay timer for scheduling a response according to a delay value; a controller on the network for discovering an added node by sending data to the added node in a downstream timeslot previously assigned to an unused node location, said data comprising the delay value for scheduling a response from the added node to coincide with an upstream timeslot previously assigned to the unused node location, thereby avoiding collisions with the synchronous traffic on the network; for receiving the response from the added node; for configuring the added node in accordance with a previously calculated configuration; and for commencing cyclic operation of the added node. The unused node location may correspond with a removed node.

An even further embodiment comprises a system for adding a node into a network operating in a cyclic state without interrupting the synchronous traffic of on the network, comprising: means for discovering an added node by sending data to the added node in a downstream timeslot previously assigned for sending data to the added node, said data comprising a delay value for scheduling a response from the added node to coincide with an upstream timeslot known to be unused, thereby avoiding collisions with the synchronous traffic on the network; means for receiving the response from the added node; means for configuring the added node in accordance with an original configuration of the removed node; and means for commencing cyclic operation of the added node.

The methods of the present invention may be implemented as a computer program product with a computer-readable medium having code thereon.

An advantage of the present invention is that it adds live attachment to cyclic networks without changing their essential character and therefore without undue complexity. It also adds live attachment to cyclic networks without sacrifice to their performance. Moreover, it is applicable to almost any cyclic network where the physical characteristics of the network allow a node or group of nodes to be removed while still permitting communication to the remaining nodes.

Further objects and advantages of our invention will become apparent from a consideration of the drawings and the technical description.

All patents, patent applications, provisional applications, and publications referred to or cited herein, or from which a claim for benefit of priority has been made, are incorporated herein by reference in their entirety to the extent they are not inconsistent with the explicit teachings of this specification.

BRIEF DESCRIPTION OF THE DRAWINGS

A more complete appreciation of the invention and many of the attendant advantages thereof will be readily obtained as the same become better understood by reference to the following detailed description when considered in light of the following drawings, wherein.

DETAILED DESCRIPTION OF THE PREFERRED EMBODIMENTS

Figure 1:
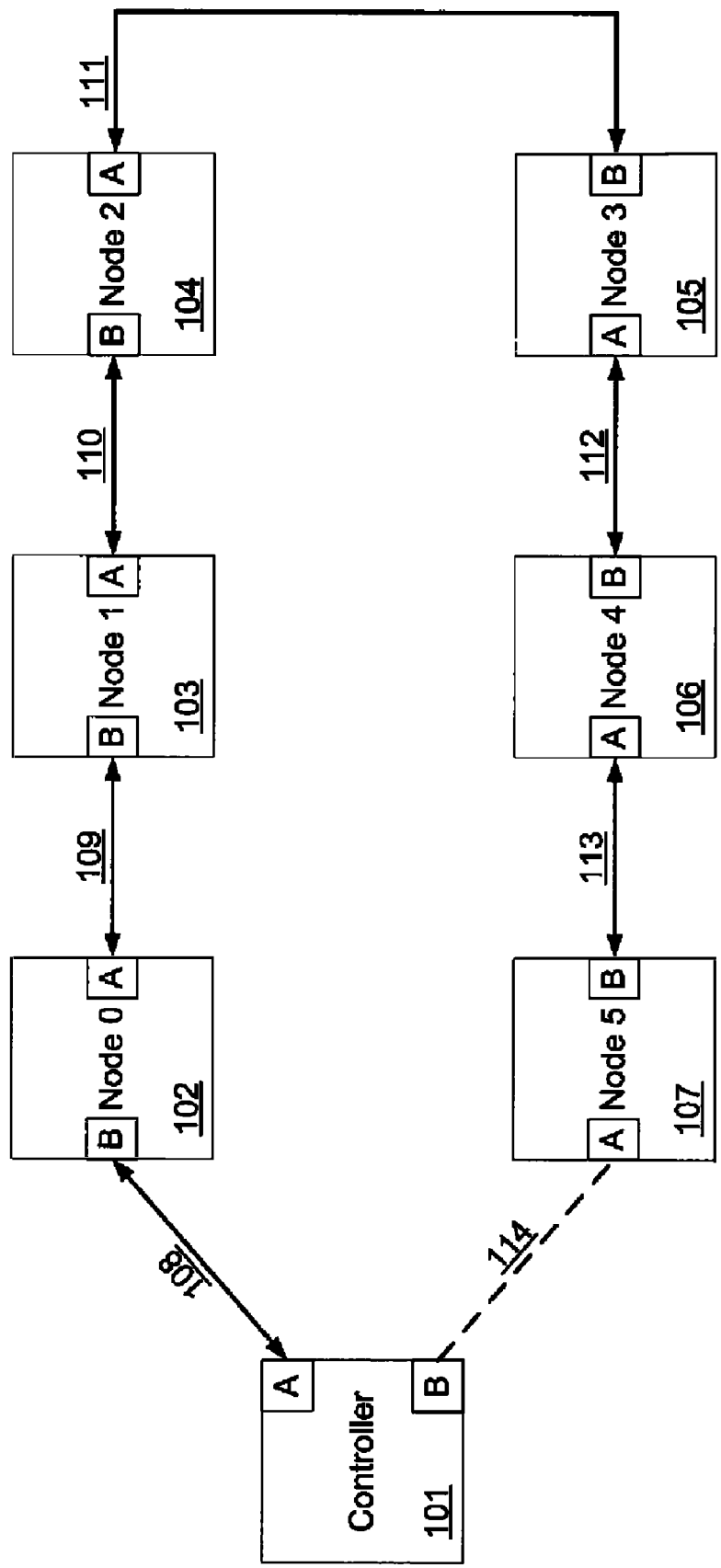
FIG. 1: Normal operation of the network

Referring now to the drawings, wherein like reference numeral designate identical or corresponding parts throughout the several views, and more particularly to FIG. 1 thereof, an example network upon which the invention can be utilized is shown. The topology is a full-duplex ring. In one embodiment, the invention can be embodied as a set of improvements to the cyclic, full-duplex, self-healing network taught by Pearce and Cline (U.S. Pat. Nos. 7,143,301 and 7,024,257), incorporated herein by reference.

Figure 2:
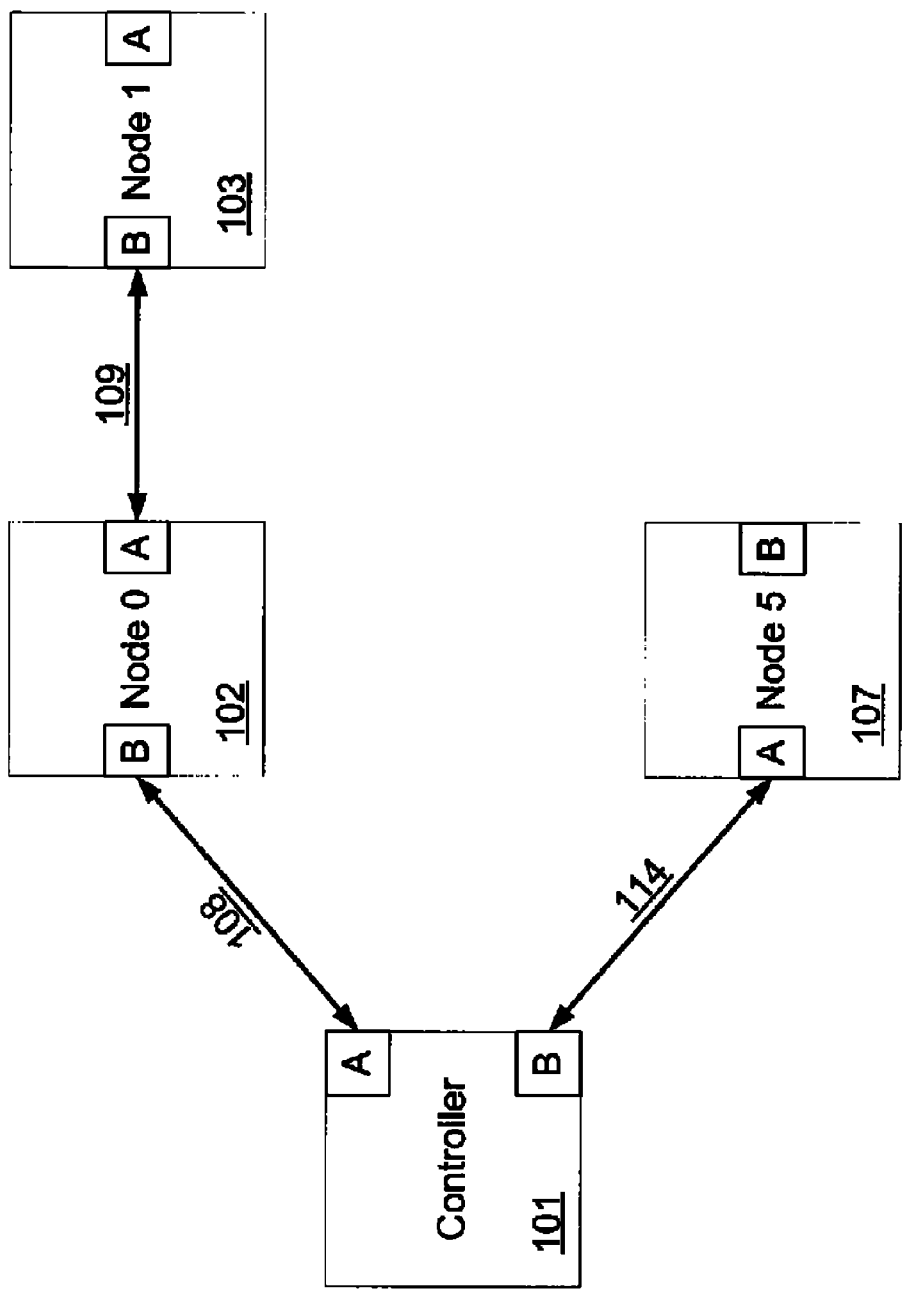
FIG. 2: The network with three nodes removed
Figure 3:
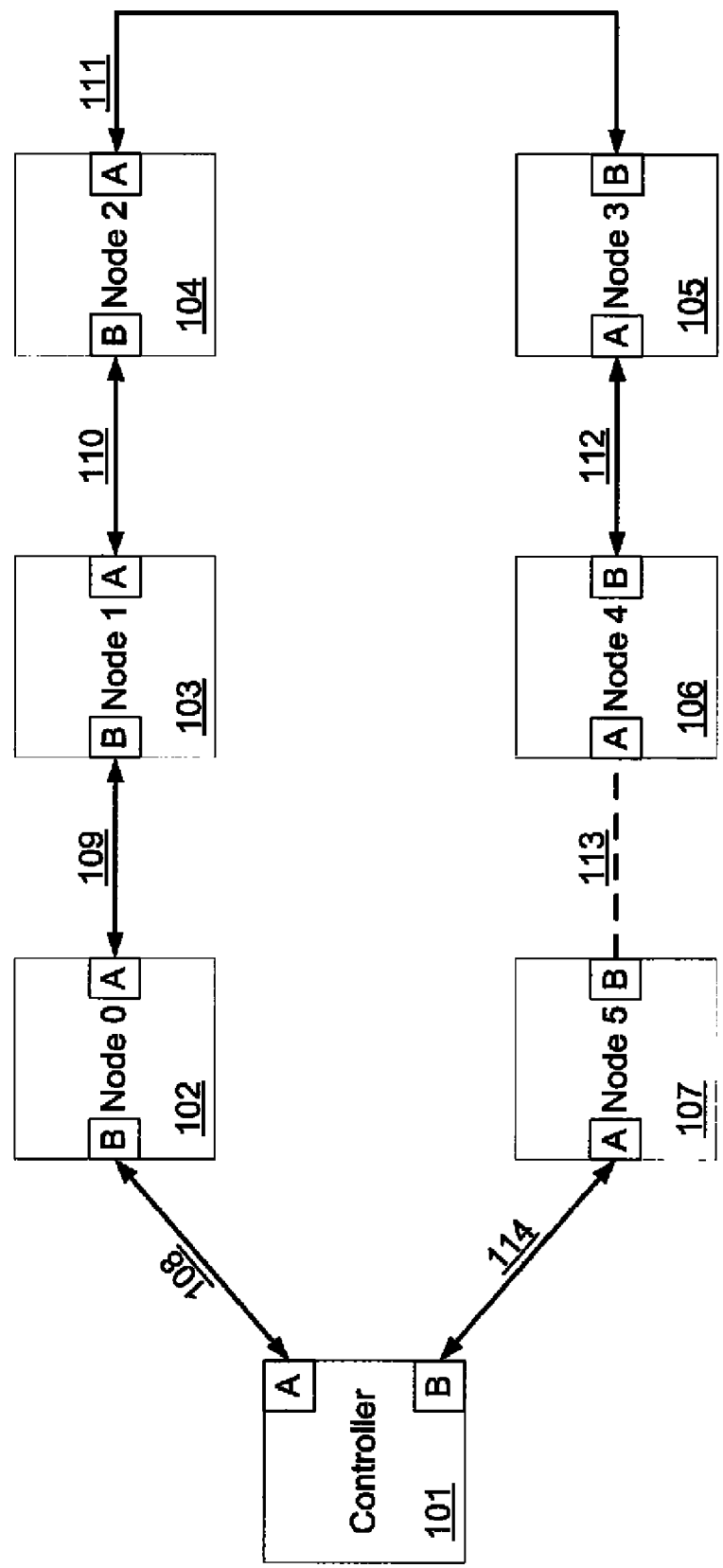
FIG. 3: The network following hot-replace

The network of FIG. 1 comprises a controller 101 and seven links (e.g., bi-directional, full-duplex) capable of carrying traffic in both directions simultaneously 108, 109, 110, 111, 112, 113, 114 and six nodes 102, 103, 104, 105, 106, 107. FIG. 2 shows the network still operational after three nodes 104, 105, 106 have been removed. FIG. 3 shows the network still operational after three nodes 104, 105, 106 have been re-attached and hot-replace has been completed.

Figure 4:
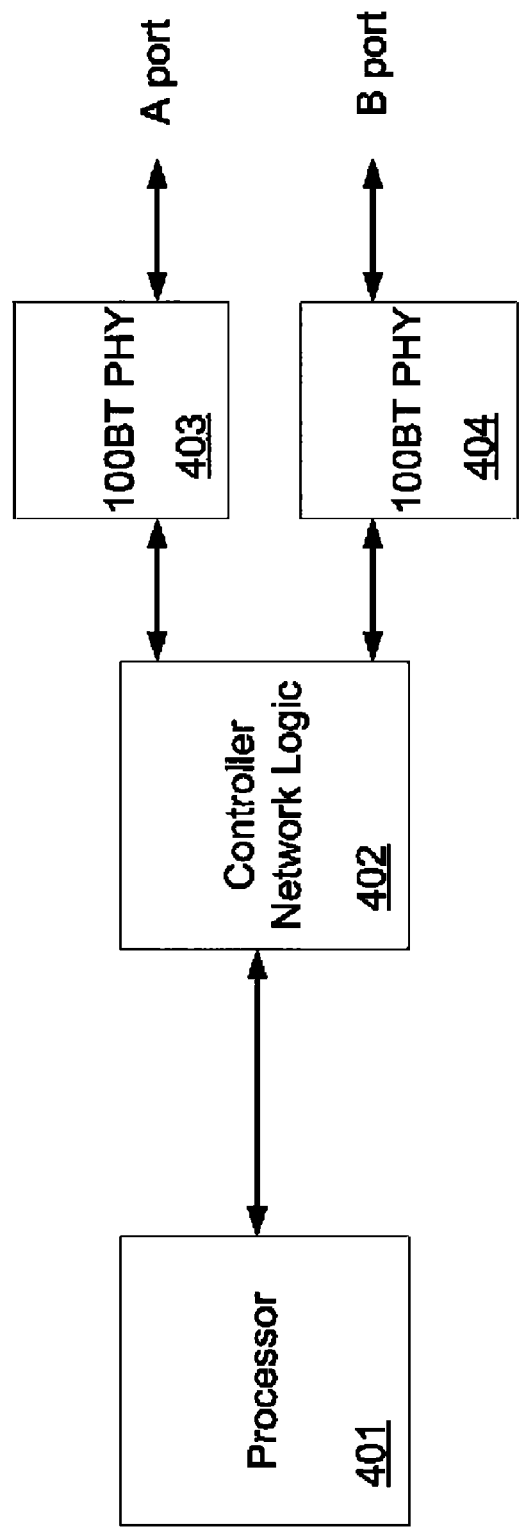
FIG. 4: Controller Block Diagram

FIG. 4 illustrates an example of a controller, which comprises a processor 401, the controller network logic 402 and two PHYs 403 (controller A port) and 404 (controller B port). A PHY is a combined, full-duplex, receiver plus transmitter circuit. The controller network logic is a complex digital circuit that can be realized as an FPGA. When the network is operational, the controller network logic is responsible for the transmission of downstream packets according to a repeating timetable and will likewise receive packets when they are sent by the nodes.

Figure 5:
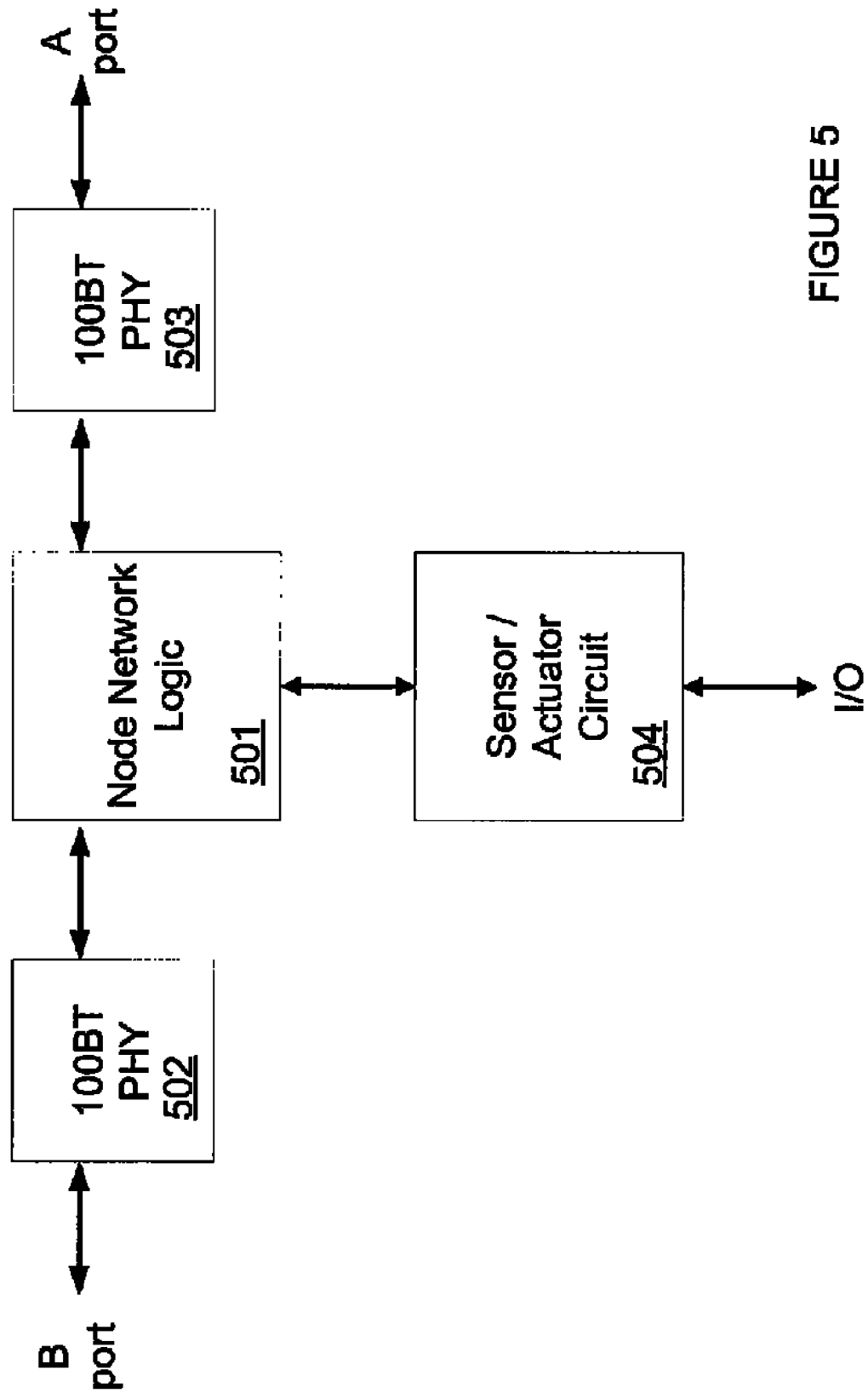
FIG. 5: Node Block Diagram

FIG. 5 illustrates an example of principal elements of a node. The network-related portion of each node comprises a complex digital circuit called the node network logic 501, and two PHYs 502 (Node B port) and 503 (Node A port)—one for each network port. When the network is operational, the node network logic is responsible for the transmission of upstream packets according to a repeating timetable and will likewise receive packets when they are sent by the controller. The node network logic 501 also allows the sensor/actuator circuit 504 to be configured and subsequently monitored/controlled via the network.

Figure 6:
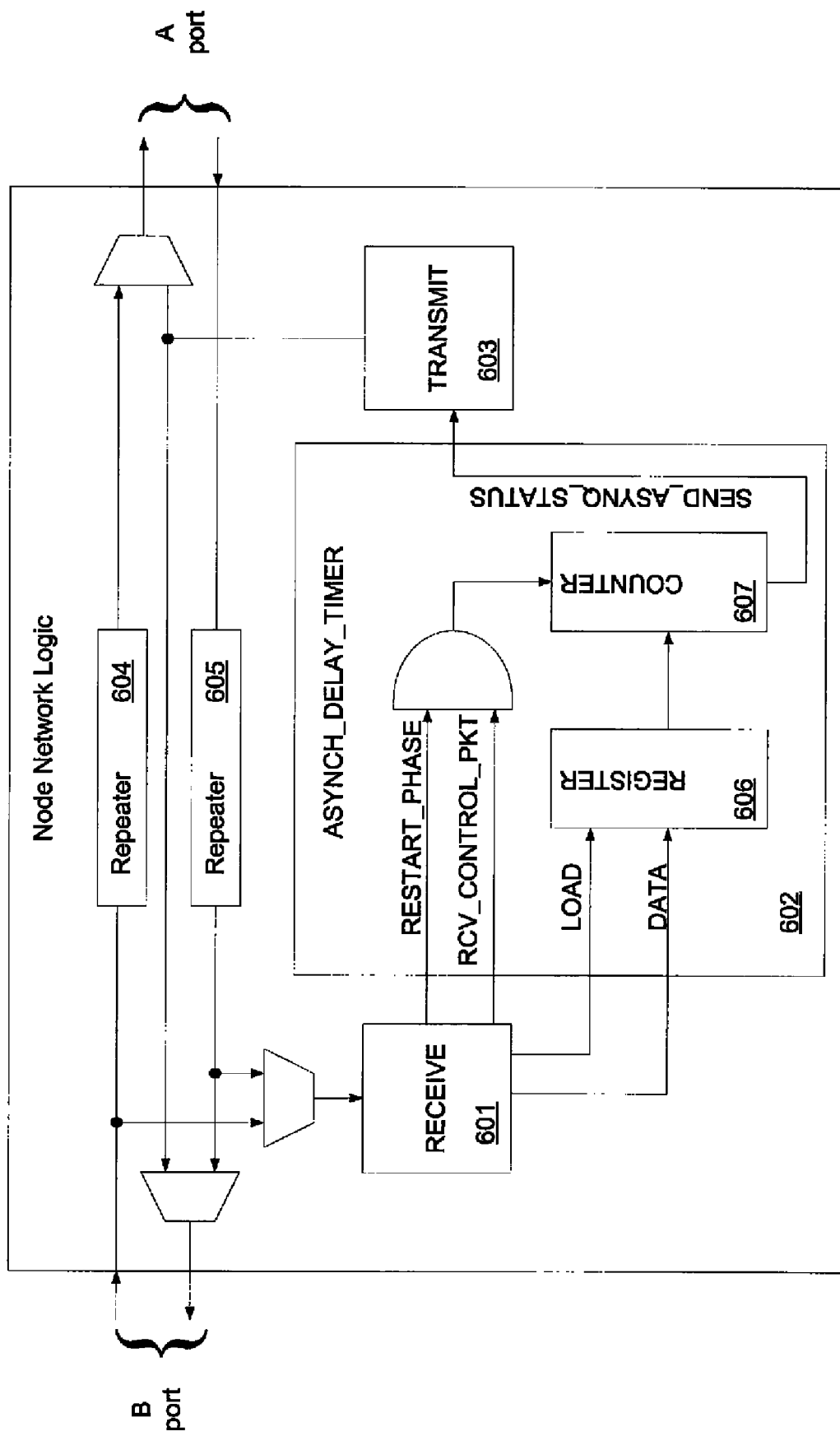
FIG. 6: Asynchronous Delay Timer

FIG. 6 presents a simplified view of the internal structure of node network logic 501. Packets are selectively received by the receive circuit 601 (Node packet receive circuit). The signal LOAD is transiently set when a specific CONTROL packet is received carrying DATA that is configured (e.g. by means of an internal bit field within said packet) to be loaded into the register 606. The signal RESTART_PHASE is set by the receive circuit 601 during discovery, initialization, and hot-replace but not during cyclic operation of the node. The signal RCV_CONTROL_PKT is transiently set by the receive circuit 601 when a CONTROL packet is received. The asynchronous delay timer 602 is activated when both RESTART_PHASE and RCV_CONTROL_PKT are set, this process loads the contents of the register 606 into the counter 607 and when the counter 607 reaches its terminal value, the SEND_ASYNQ_STATUS signal causes the transmit circuit 603 (Node transmit buffer and cyclic packet transmission time control circuit) to send a STATUS packet. After discovery of the node, packets are relayed to the next node through the repeaters 604 (B to A port repeater) and 605 (A to B port repeater).

Figure 7:
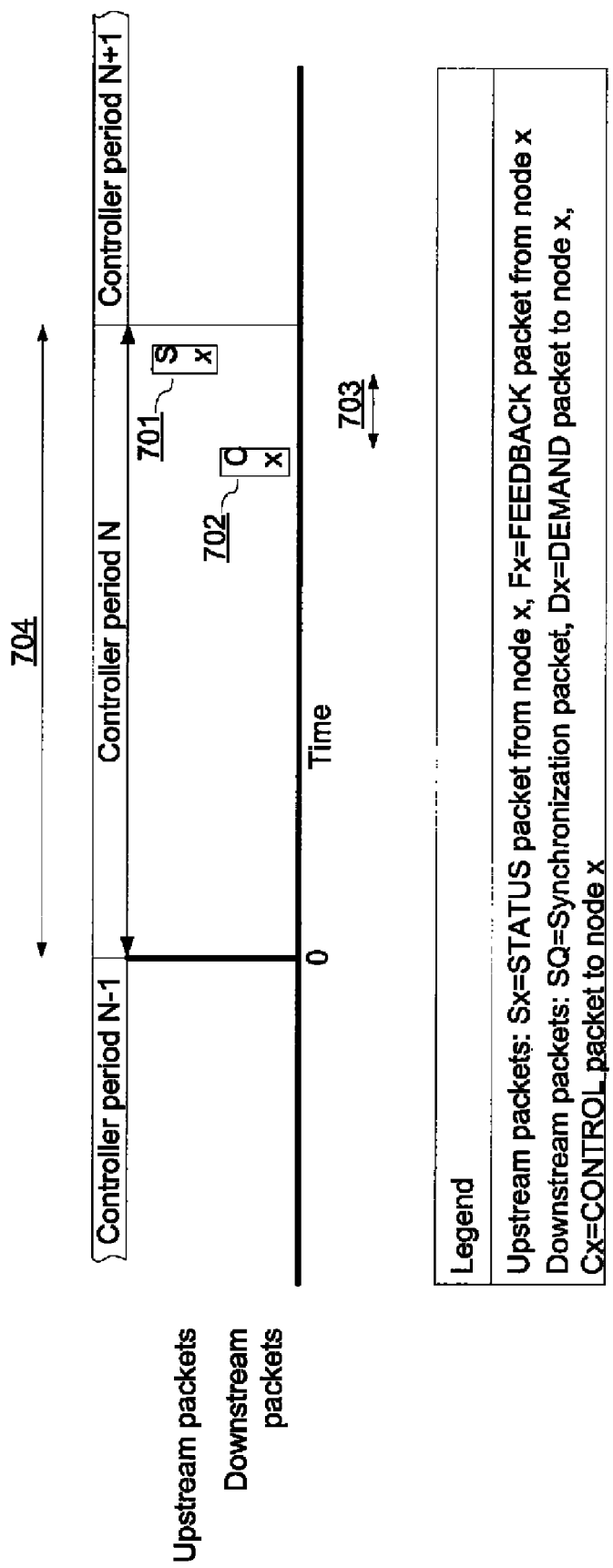
FIG. 7: Discovery Asynchronous Packets

FIG. 7 shows the packets used during node discovery when the network traffic is acyclic. The controller sends a CONTROL packet 702 (Downstream CONTROL packet to node x) downstream to the node 102 which responds with a STATUS packet 701 (Upstream STATUS packet from node x) that is sent upstream to the controller after a response delay time 703 (Response delay of upstream STATUS packet from node x) set by the Asynchronous Delay Timer 602. From a network standpoint, there is no necessary relationship between the timing of the downstream packet 702 and the network cycle time 704, but it may be convenient to arrange for just one downstream packet to be sent per network cycle so as to avoid additional complexity in the controller node logic 402.

Figure 8:
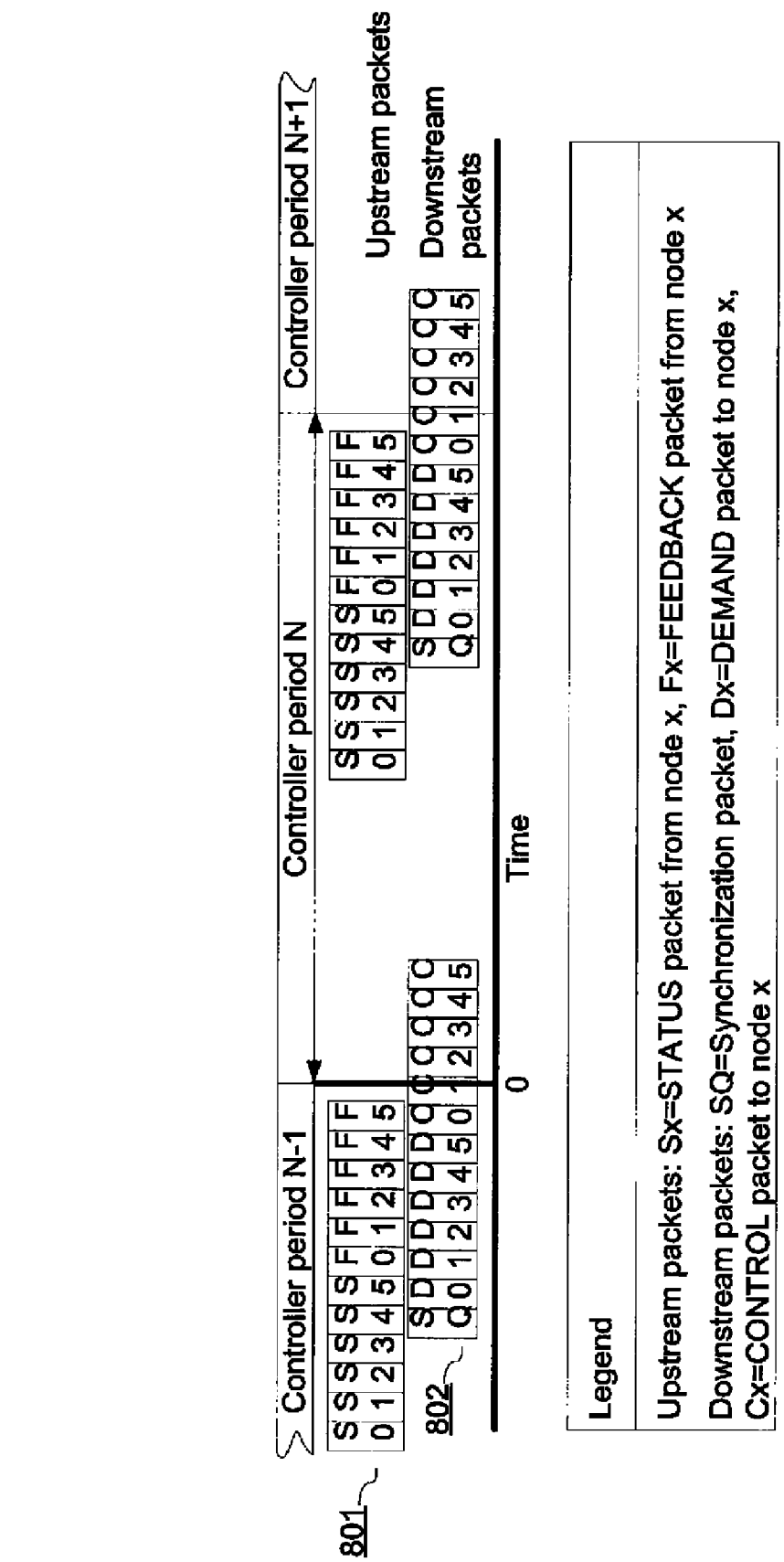
FIG. 8: Normal Cyclic Packets

FIG. 8 illustrates the repeating timetable of packets that are transmitted during the cyclic, operational phase of the network. The cyclic set of downstream packets 802 is made up of a synchronization packet (shown as "SQ" in FIG. 8 and referred to in the specification as the SYNQ packet) received by all nodes, a separate DEMAND packet for each node (D0, D1 etc.) and a separate CONTROL packet for each node (C0, C1 etc.). The cyclic set of upstream packets 801 is made up a separate STATUS packet from each node (S0, S1 etc.) and a separate FEEDBACK packet from each node (F0, F1 etc.). Packets are separated by inter-packet gaps that are not shown here for reasons of scale.

Figure 9:
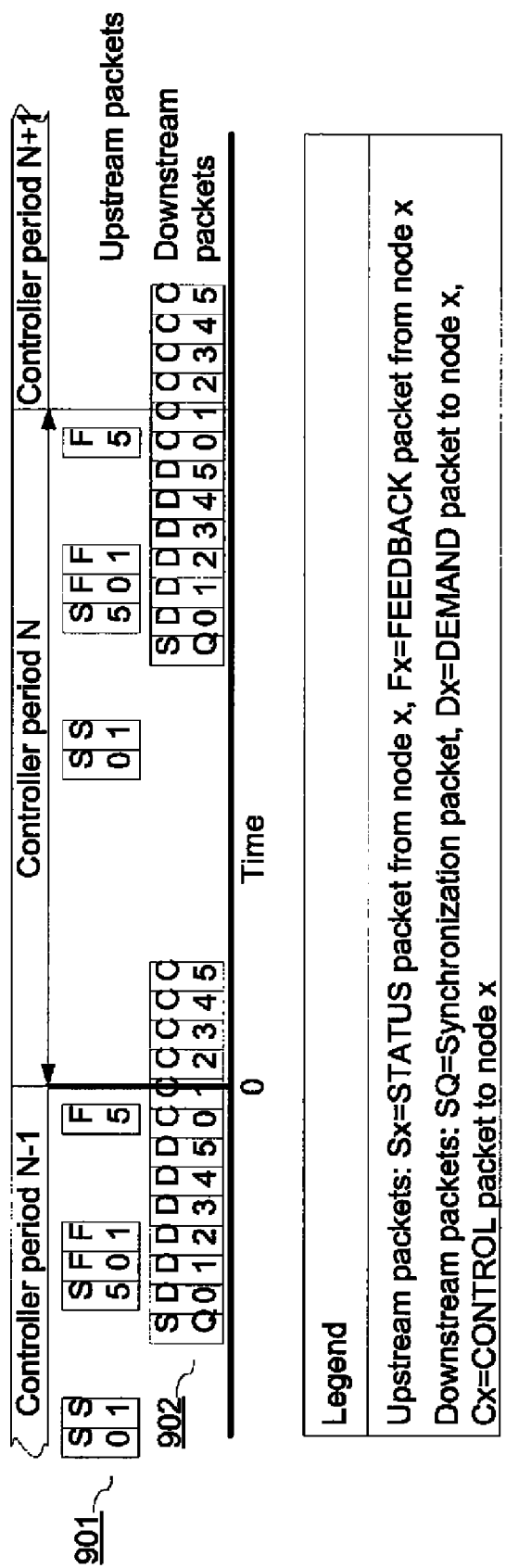
FIG. 9: Cyclic Packets following removal of nodes 2, 3 & 4

FIG. 9 illustrates the repeating timetable of packets that are transmitted during the cyclic, operational, phase of the network when nodes 2, 3 and 4 have been shutdown or removed. The cyclic set of downstream packets 902 is made up of the SYNQ packet, a separate DEMAND packet for each node in the original network and a separate CONTROL packet for each node in the original network, i.e. 902 is the same as 802. The cyclic set of upstream packets 901 comprises a separate STATUS packet from each remaining node and a separate FEEDBACK packet from each remaining node.

Figure 10:
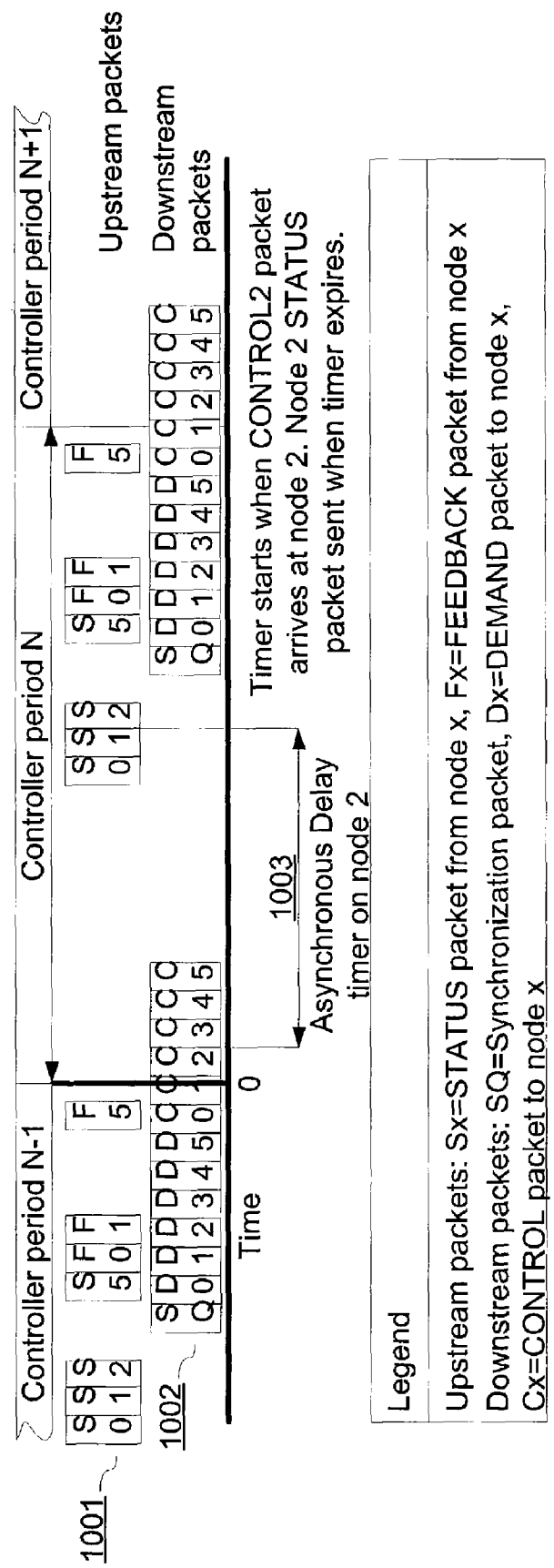
FIG. 10: Cyclic Packets during Restart
Figure 11:
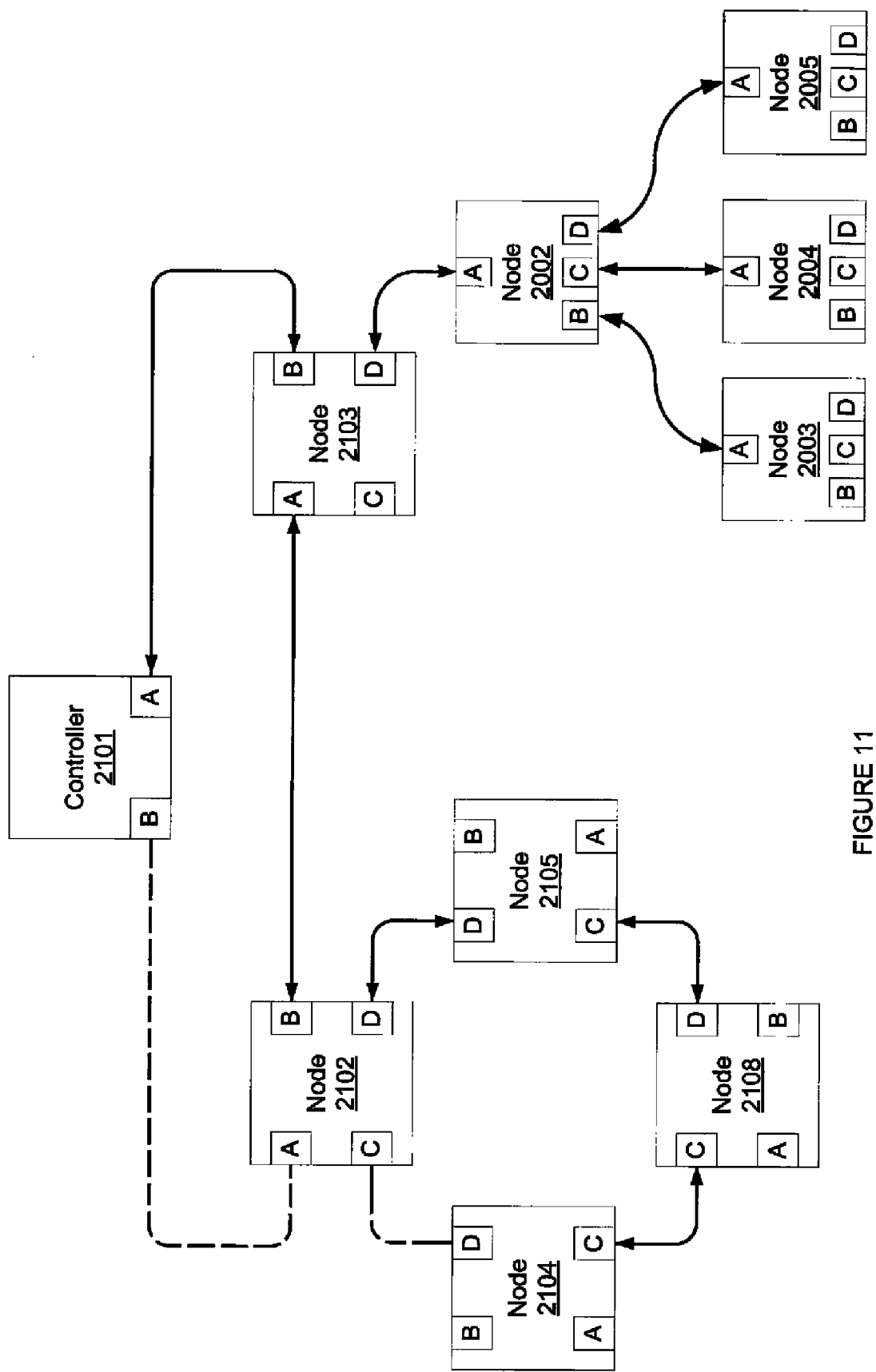
FIG. 11: A ring topology network with a ring topology sub-network and a tree topology sub-network
FIG. 12 Node timing control
FIG. 13 The network with the nodes 2, 3 & 4 re-attached
FIG. 14 The network with node 2 re-discovered
FIG. 15 The network with nodes 2 and 3 re-discovered
FIG. 16 A half-duplex, cyclic network
FIG. 17 Half-duplex cyclic network: Network node logic showing the asynchronous delay timer (simplified view)
FIG. 18 A ring topology network with two tree ring topology sub-networks
FIG. 19 Half-duplex: cyclic schedule of packets FIG. 20 Network with a tree topology FIG. 21 Network with a ring of rings topology FIG. 22 Simplified PLL and Timer FIG. 23 Flow diagram of the process of bringing the SynqNet network to its cyclic state FIG. 24 Flow diagram of the SynqNet node discovery process from controller port A FIG. 25 Flow diagram of the hot-replace process It should be understood that in certain situations for reasons of computational efficiency or ease of maintenance, the ordering of the blocks of the illustrated flow charts could be rearranged or moved inside or outside of the illustrated loops by one skilled in the art. While the present invention will be described with reference to the details of the embodiments of the invention shown in the drawing, these details are not intended to limit the scope of the invention.

FIG. 10 illustrates the repeating timetable of packets that are transmitted during the cyclic, operational phase of the network when node 2 has been re-attached and the controller is carrying out re-discovery. The cyclic set of downstream packets 1002 is made up of the SYNQ packet, a separate DEMAND packet for each node and a separate CONTROL packet for each node. The cyclic set of upstream packets 1001 is made up of a separate STATUS packet from each node that continues to communicate cyclically (i.e. nodes 0, 1 & 5 plus node 2 which is being re-discovered) and a separate FEEDBACK packet from each node that continues to communicate cyclically (i.e. nodes 0, 1 & 5). A delay 1003 is enforced by Asynchronous Delay timer on node 2.

Figure 12:
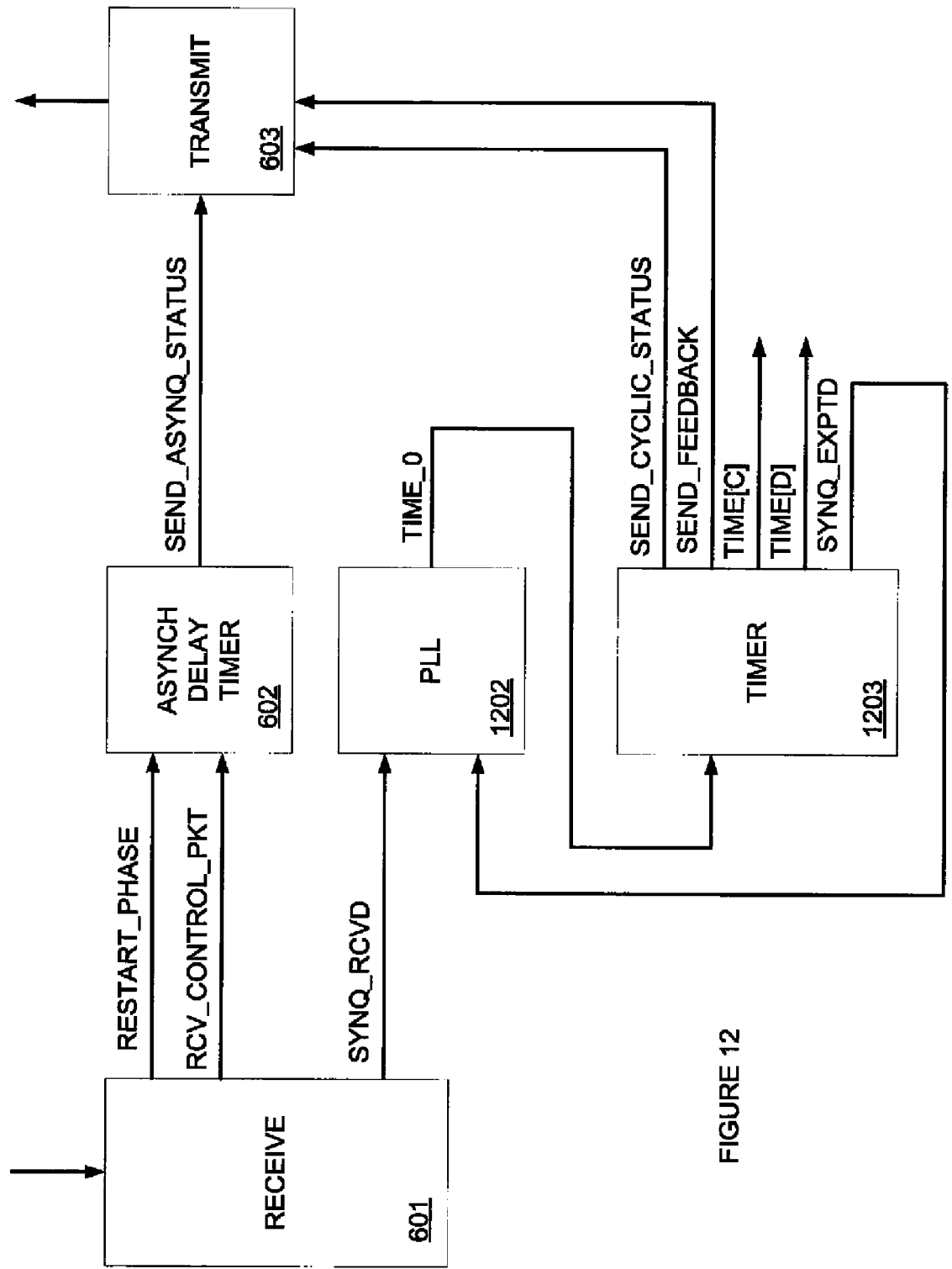

FIG. 12 shows the node timing control logic; this is a more detailed view within the node network logic 501 of node x. The receiver 601 monitors packets arriving from the controller. During discovery, initialization, and hot-replace, the asynchronous delay timer 602 controls the transmitter 603 as previously described in FIG. 6. In normal cyclic operation, the phase-locked loop 1202 and node timer 1203 combine to maintain lock between the controller "time 0" and node "time 0". See FIG. 22 for more detail on the phase-locked loop and timer. In cyclic operation, the timer also controls when the transmitter sends packets, as well as other internal scheduled events (such as feedback sample). Timer values have been calculated to compensate as necessary for network propagation delays and internal logic delays.

Figure 13:
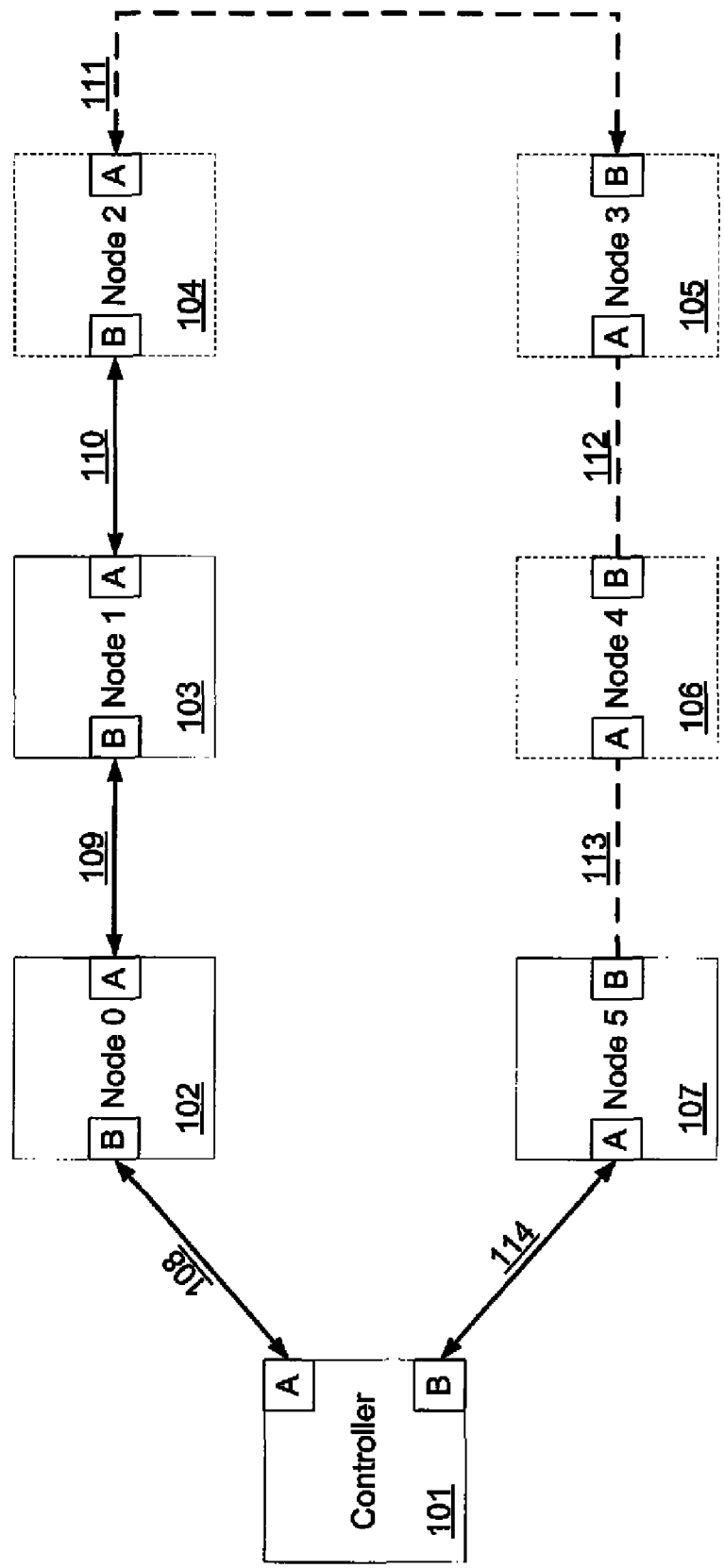

FIG. 13 shows a six-node network where three nodes (nodes 2, 3 and 4) have been re-attached but have not been re-discovered.

Figure 14:
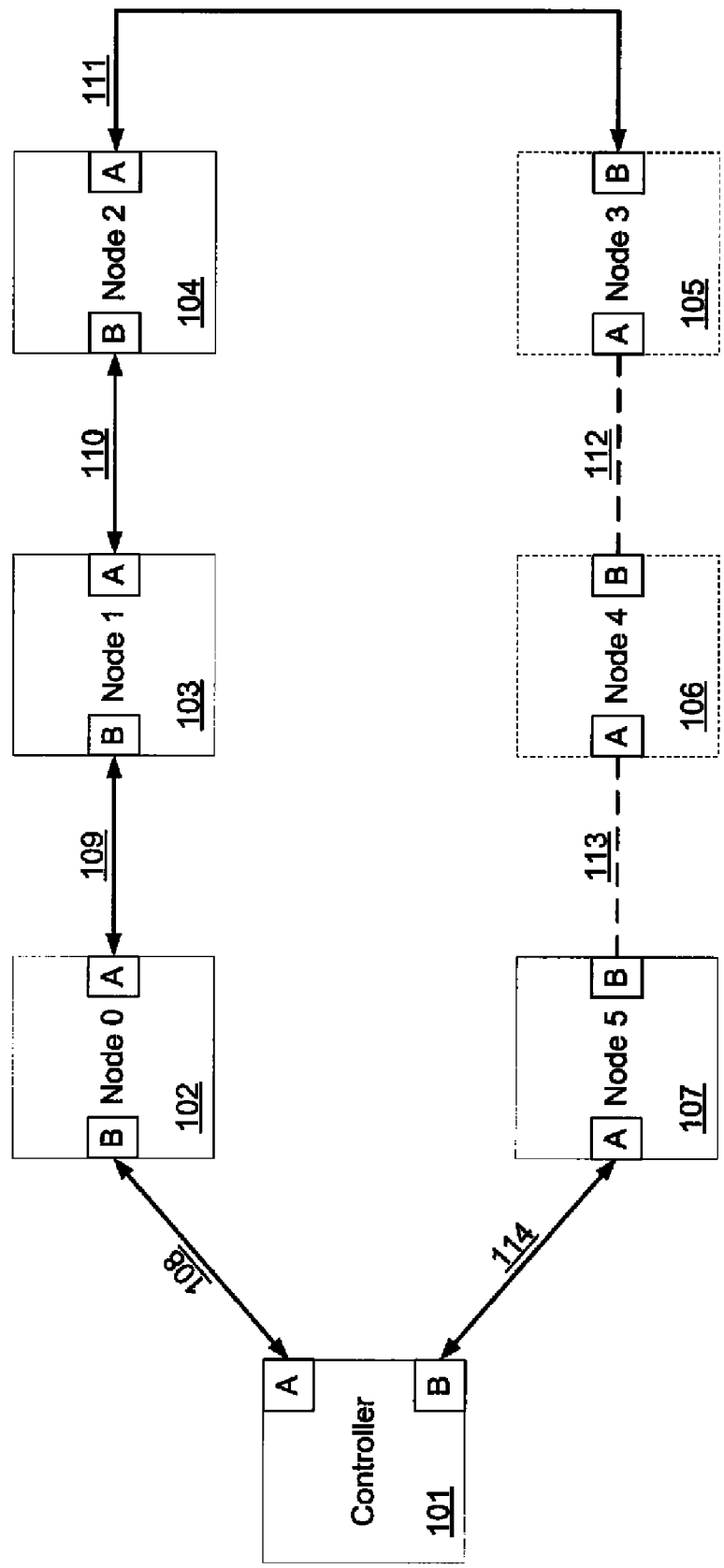

FIG. 14 shows a six-node network where two nodes (nodes 3 and 4) have been re-attached but have not been re-discovered.

Figure 15:
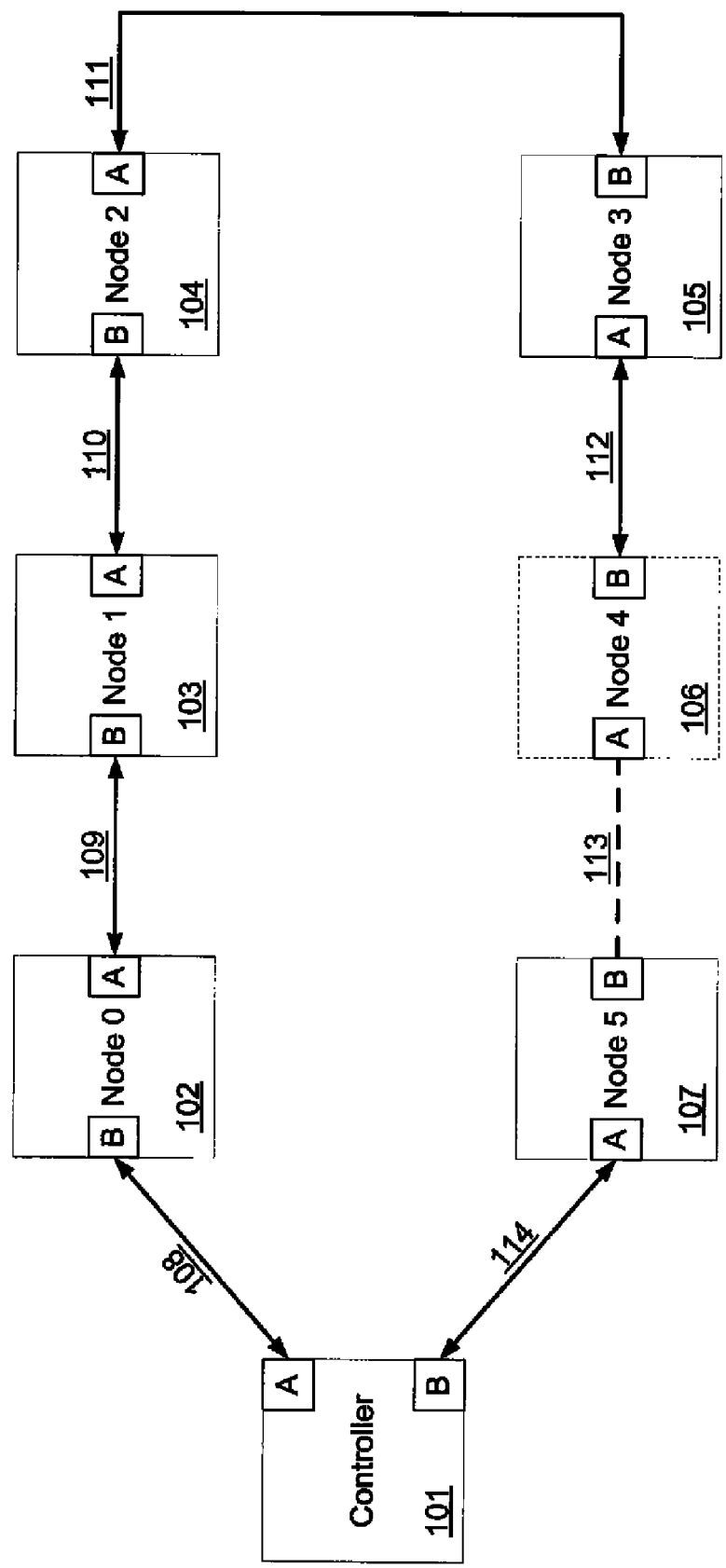

FIG. 15 shows a six-node network where one node (node 4) has been re-attached but has not been re-discovered.

Figure 22:
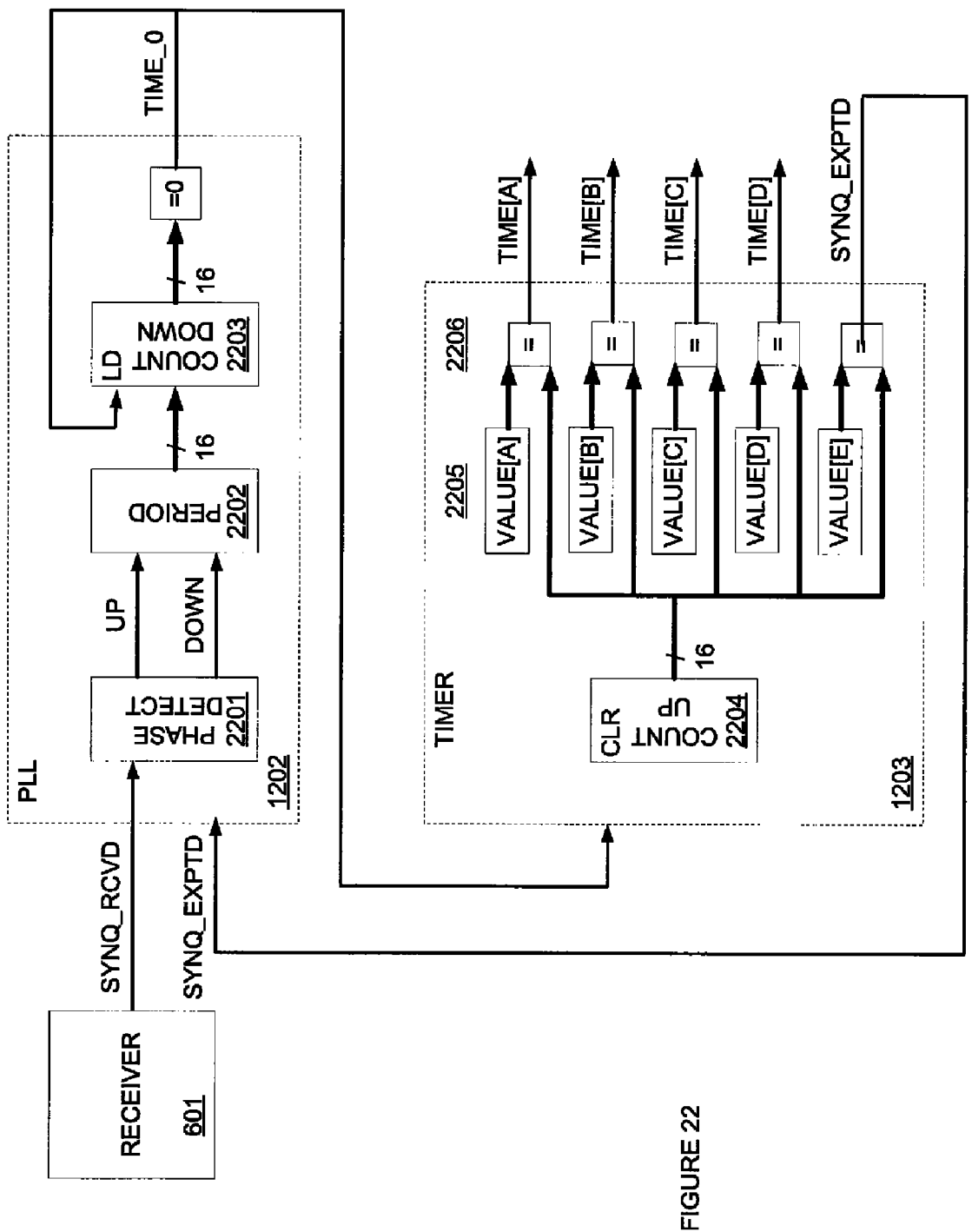

FIG. 22 shows a simplified view of the phase-locked loop (PLL) 1202 and timer internals 1203 in order to describe synchronization while in normal cyclic operation. The processes of discovery, initialization and acquisition will be ignored here for clarity. The receiver 601 indicates the reception of each valid SYNQ packet with the signal SYNQ_RCVD to the PLL. This triggers the phase detection logic 2201 to compare actual arrival time versus expected arrival time indicated by the signal SYNQ_EXPTD. The phase error is filtered (not shown) and the PLL period register 2202 is adjusted up or down if necessary. When the down-counter 2203 reaches 0, the signal TIME_0 reloads the down-counter with the adjusted period. Note this TIME_0 signal tracks the controller heartbeat in both phase and frequency. The accuracy of this reference is crucial for deterministic packet transmissions. TIME_0 also triggers the timer up-counter 2204 to restart from 0. Multiple timer value registers (memories) 2205 are connected to comparator logic 2206 to generate timer outputs TIME[A, B, C, . . . ]. Of particular note is the timer output SYNQ_EXPTD, which feeds back to the PLL. During initialization, the timer value registers are loaded with values calculated to compensate for network propagation and internal logic delays in order to achieve the desired network schedule. Note that the PLL and timer continue to run and trigger events even if SYNQ packets fail to arrive. For ring fault recovery, one more feature must be added to the timer—a redundant set of timer values (not shown in FIG. 22 but taught in U.S. Pat. No. 7,024,257, U.S. Pat. No. 7,143, 301). The first set of timer values is used while the "B" port is communicating with the controller as is normal. If a fault occurs and the node switches to the redundant port "A", the second set of timer values (representing the alternate schedule) will be used.

Figure 23:
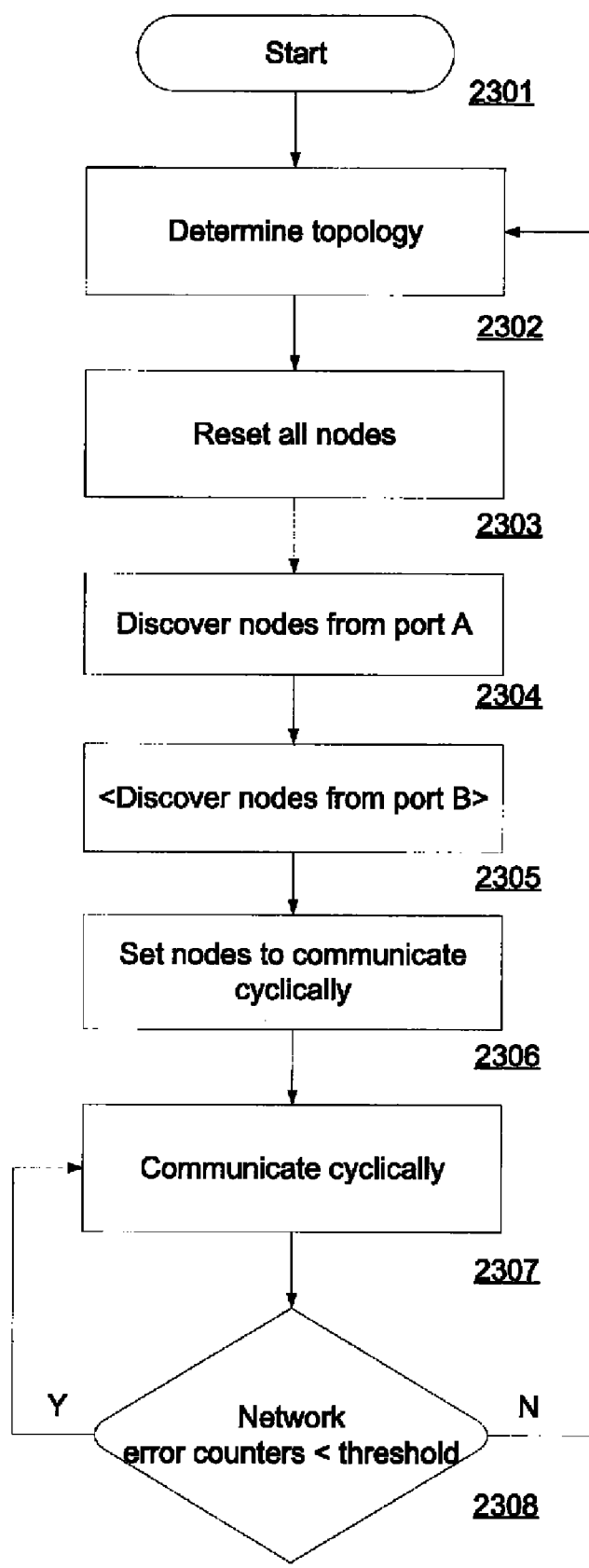

FIG. 23 is a simplified diagram of the configuration process that is required to bring the SynqNet network into its cyclic state. Step 2301—Start of network initialization process; Step 2302—Step to determine topology of network (ring or line); Step 2303—Step to reset all nodes on the network (excluding the controller); Step 2304—Sequence of steps to discover nodes connector to port A of the controller; Step 2305—Optional sequence of steps to discover nodes connector to port B of the controller; Step 2306—Step to cause nodes communicate cyclically; Step 2307—Step wherein the controller emits packets cyclically and the nodes respond by sending response packets in their allotted time-slots; Step 2308—Check that network is operating correctly by monitoring controller and node error counters.

Figure 24:
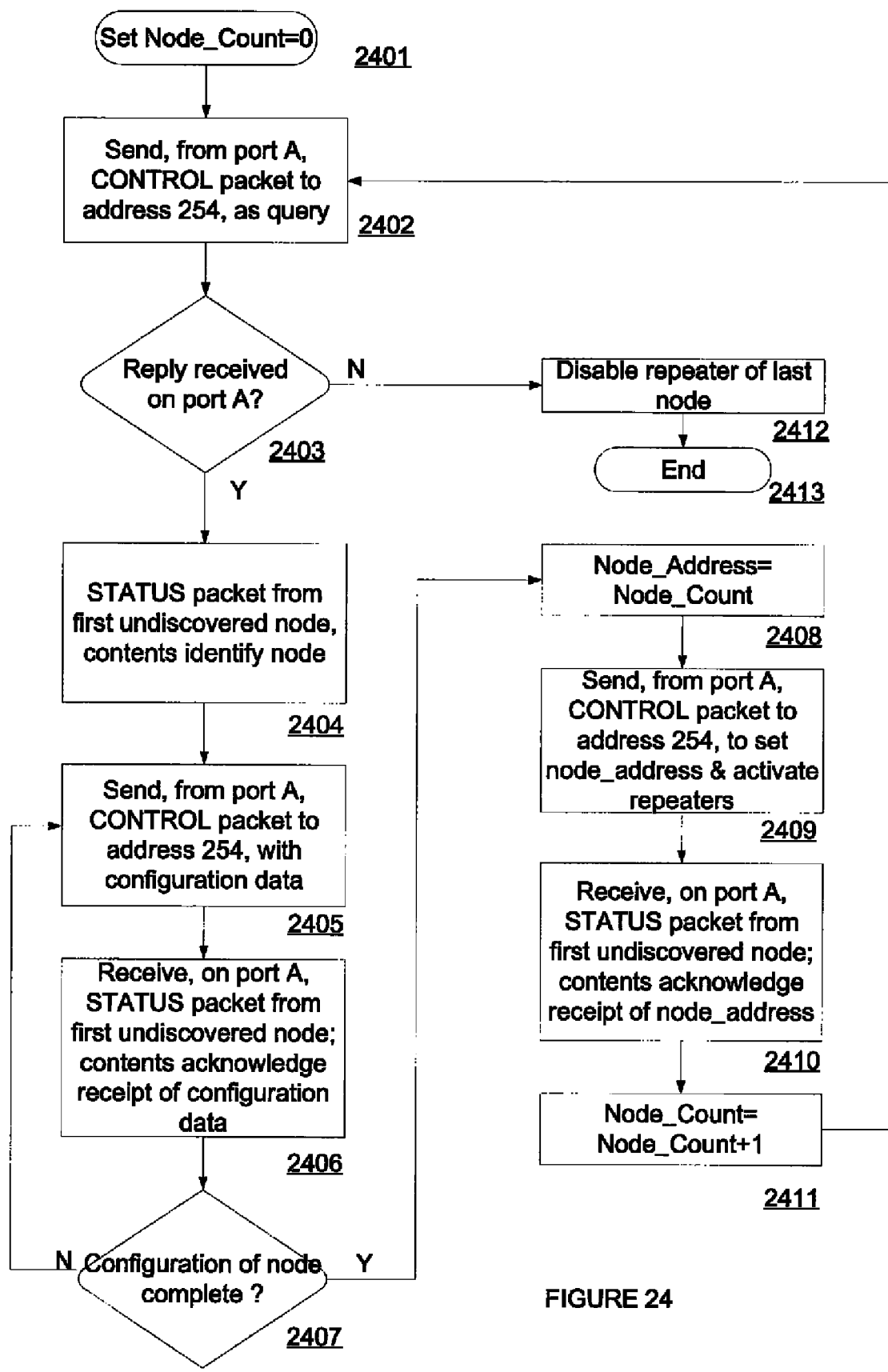

FIG. 24 is a simplified diagram of the node discovery process in SynqNet, as carried out from port A of the controller. Step 2401—Step where the controller sets a variable holding the number of discovered nodes (Node_Count) to zero, this step is omitted when discovering from the B port; Step 2402—Step to query first undiscovered node connected either directly, or via a discovered node or nodes, to port A of the controller. Only the first undiscovered node will respond to packet address 254; Step 2403—Check that a reply is received from an undiscovered node at port A of the controller; Step 2404—Step to receive status packet from first undiscovered node at port A of the controller, packet contents identify node, this begins the discovery process at said node; Step 2405—Step by the controller to configure the node undergoing discovery by sending a CONTROL packet to said node; Step 2406—Step by the controller to receive, from the node undergoing discovery, a STATUS packet from said node; this serves to confirm preceding configuration step and/or packet carries additional configuration data; Step 2407—Decision by the controller to carry out further configuration steps to the node undergoing discovery; Step 2408—Step by controller to determine which address is to be used by the node undergoing discovery by using the value of the variable Node_Count; Step 2409—Step by controller to assign an address to the node undergoing discovery by sending a CONTROL packet to the node undergoing discovery; Step 2410—Step by the controller to receive, from the node undergoing discovery, a STATUS packet from said node; this serves to confirm that the discovery process has been completed. At the end of this step said node has both upstream and downstream repeaters active and responds to packets sent its specific address only; Step 2411—Step by controller to increase the value of the variable Node_Count; Step 2412—Step by controller to disable the repeaters of the last discovered node by sending a CONTROL packet to said node and receiving a STATUS packet from the same; Step 2413—Signifies the end of the node discovery sequence from port of A of the controller.

Figure 25:
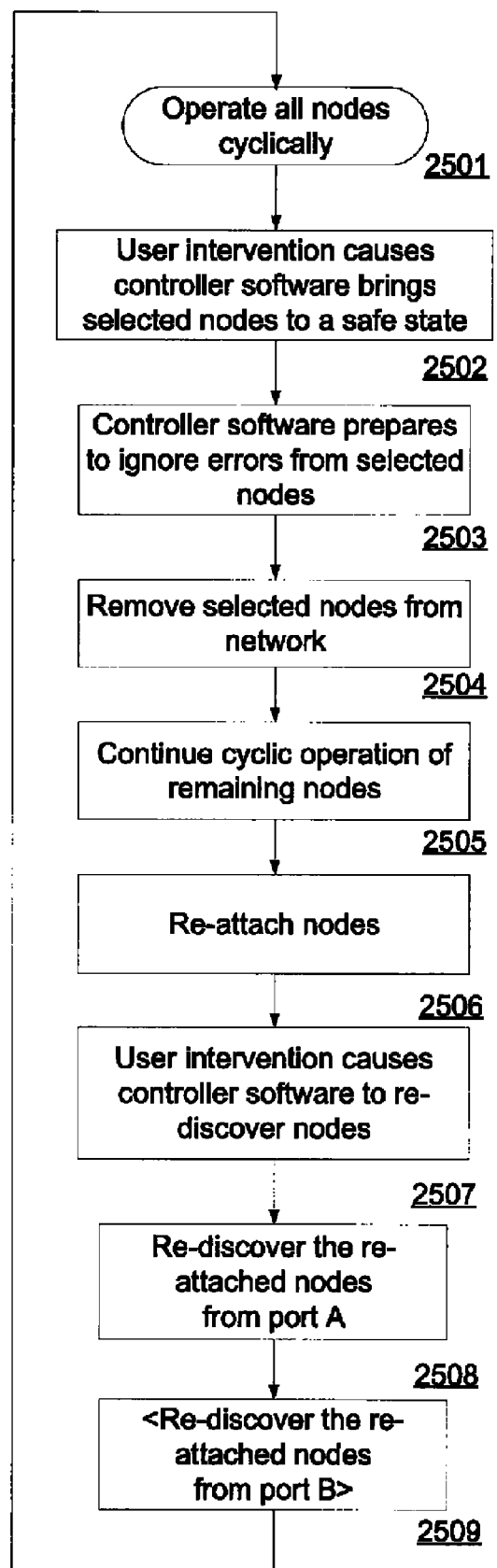

FIG. 25 is a simplified diagram of the hot-replace process in SynqNet. Step 2501—Conditions prior to or following the hot-replace process, all nodes on the network are operated cyclically; Step 2502—As a result of user intervention, the application software running at the controller brings the selected nodes that are to be disconnected into a safe state in preparation for removal from the network; Step 2503—The application software running at the controller disables error actions that would otherwise result from the removal of the nodes; Step 2504—The selected nodes are disconnected from the network; Step 2505—The remaining nodes continue to be operated cyclically for an indefinite period; Step 2506—Some or all of the nodes are re-attached or replaced and then re-attached; Step 2507—User intervention causes controller software to re-discover nodes; Step 2508—Discovery is carried out on the re-attached nodes from port A of the motion controller; Step 2509—Discovery is carried out on the re-attached nodes from port B of the motion controller.

The example operation of the first embodiment will now be illustrated. Turning back to FIG. 1, a representative network of six nodes and a controller is shown. The topology is a full-duplex ring and is implemented using SynqNet. Normal packet traffic is in both directions across the full-duplex links 108, 109, 110, 111, 112, 113, 114 between nodes 102, 103, 104, 105, 106, 107 and the controller 101. The network topology is a ring and under normal operation, the redundant link 114 which closes the ring does not carry return packets from nodes and is thus said to be 'idle' (N.B. during cyclic operation the controller sends the same set of packets from ports A and B, therefore the redundant link 114 is idle only in one direction).

An important practical aspect of the network is that the controller 101 can transmit packets from one or both of its A and B ports simultaneously or it can cease to transmit from either of these ports. This feature allows the controller to carry out discovery of the nodes from either the B or the A port and to operate a ring network with a missing node or link.

A further important practical aspect of the network is that the network node logic can be configured so that the repeaters 604 and 605 can be selectively disabled, furthermore the transmit circuit 603 can be configured to selectively use either the A or the B port or both ports and as result the A port or the B port can be independently configured to be silent (i.e. either actually quiescent electrically or at least carrying no data; for example carrying idle symbols only). By way of illustration in FIG. 1 the A port of node 5 (107) is silent and the link 114 is idle. As indicated in FIG. 6, the receive circuit 601 can accept packets from either the A or B ports.

To reach the operational state of the network shown in FIG. 1 and FIG. 8, the processor 401 in the controller (FIG. 4) first has to configure the network. Configuration embraces, discovery (finding the order and type of nodes), enumeration (assigning each node a network address), configuration of the control registers within the node network logic 501 and configuration of the operational settings of the sensor/actuator circuit 504 within each node. In particular, the controller has to determine the set of downstream packets 802 that should be sent and their timing schedule. Similarly the controller has to determine the set of upstream packets 801 that the controller should receive and their timing schedule. When the controller has determined this information the controller must configure the network node logic 501 in each node (in particular timer value registers 2205) and the network logic in the controller itself 402 so that the network is prepared to transition to cyclic communication for both upstream and downstream traffic according to the desired schedule.

SynqNet has destination node addressing; the address range 0.251 selects the destination node (which must have first been assigned an address during discovery), packets with address 255 are received by all nodes (i.e. broadcast) and address 254 is received by an undiscovered node only.

The configuration process is summarized in FIG. 23: the process starts 2301 under program control at the controller, the controller first determines the topology of the network 2302 by broadcasting a special packet from port A of the controller which will return to the B port of the controller if the network is a ring, otherwise it will return to port A of the controller.

The controller then 2303 puts all nodes into the undiscovered state by repeatedly broadcasting RESET_REQUEST packets from ports A and B of the controller and waiting for a response from the far end of the network, at this time the controller ceases to send RESET_REQUEST packets and all nodes enter their undiscovered state. This action is equivalent to power-cycling the network since a node emerges from power-up in the undiscovered state. When a node is in the undiscovered state neither repeater 604 and 605 is active and the node has no assigned address, it will however respond to the special undiscovered node address (namely 254). The next step 2304 is to discover the nodes accessible to port A of the controller (this procedure will be described in further detail below). If the network is not a ring it then a further step 2305 is required to discover nodes accessible to port B. When all nodes have been discovered (and in the process also enumerated and otherwise configured) the network is transitioned to cyclic network traffic 2307 by setting a flag in the SYNQ packet which is broadcast to all nodes (SQ in 802).

Cyclic operation is the normal operational state of the network. The controller 101 emits cyclic downstream packets to each node as well as a global timing packet (SYNQ packet—designated SQ in 802). The nodes 102, 103, 104, 105, 106, 107 synchronize their local clock to the timing packet from the controller using the period and delay parameters that have been set-up during configuration. After a small delay to allow all node clocks to stabilize, the nodes begin to send back their cyclic packets 801. Each node sends back a STATUS packet in a previously assigned time-slot (Sx in 801) and a feedback packet in another previously assigned time-slot (Fx in 801). The network traffic is now cyclic as depicted in FIG. 8. The network will exit the cyclic state 2308 when network error counters at the nodes or the controller exceed their pre-determined thresholds.

The discovery process will now be described in detail. The network traffic is asynchronous during the discovery process as depicted in FIG. 7. A CONTROL packet 702 is sent to the node undergoing discovery by setting the destination address in the CONTROL packet header to 254, a special address to which only an undiscovered node will respond. The node responds with a STATUS packet 701. The configuration process is carried out by the controller communicating with each node one at a time, and with no constraints on when the downstream (CONTROL) packets are sent or the delay time 703 before the upstream (STATUS) packet is returned (in practice this delay is very short because the processing time through the network node logic 501 takes just a few microseconds). As only one node is being configured, there is no risk of the packets from a node colliding with the packets from another node. Every CONTROL packet sent by the controller is responded to by a STATUS packet from the node, the CONTROL packet has internal flag, address and data fields which determine whether data is to written to the node or read from the node.

Referring to FIG. 1, the controller 101 discovers and configures each node 102, 103, 104, 105, 106, 107 in sequence from its A port. FIG. 24 is a simplified flow diagram of the discovery process. When discovering from the controller's A port, the controller's count of discovered nodes is set to zero 2401. The controller then sends a CONTROL packet to address 254, the first undiscovered node responds with a STATUS packet that identifies the node. At this point it is possible to estimate the cable length to the B port of the node by measuring round-trip message times (See U.S. Pat. No. 7,024,257, U.S. Pat. No. 7,143,301), or from measurements made by the PHY devices. Several CONTROL packet 2405 and STATUS packets 2406 are then exchanged until the controller determines 2407 that the configuration of the node is complete. At this point 2408 the controller reserves the next available node address for the node undergoing discovery, this address is sent in a CONTROL packet to the node 2409 which acknowledges 2410 with a STATUS packet and thereby exits the discovery state. The controller then increments its tally of discovered nodes 2411 and proceeds to the discovery of the next node 2402. The controller detects the final link 114 when it attempts to discover a node connected to the A port of the last node in the network 107, this will fail at step 2403 as no node will reply to the CONTROL packet. The controller then arranges 2412 for repeaters of last node 107 to be inactive by sending a CONTROL packet for that purpose. At the end of the discovery process 2413 the final link 114 will be idle during cyclic communication.

If the network had instead been a dual string (i.e. two, distinct, line-topology networks), such as that shown in FIG. 2, the controller would have continued 2305 the discovery process from its B port to reach nodes not accessible from the A port.

A ring-connected SynqNet network such as FIG. 1 can remain cyclic even when a cable is removed or when a contiguous group of nodes is disconnected. The key mechanism is that each node is able to detect when its upstream neighbor is no longer forwarding packets to it, the node then turns off its repeaters and sends a packet to its erstwhile downstream neighbors which causes them to exchange the function of the their A and B ports (in effect they become upstream neighbors). Additional mechanisms (See U.S. Pat. No. 7,024,257, U.S. Pat. No. 7,143,301) ensure that the local clocks are adjusted for the different routing of the packets.

Hot-replace is here defined as the ability to disconnect, power-down, optionally substitute and then re-attach one or more nodes and then re-start those nodes, all without interrupting normal cyclic operation of the other nodes in the system.

Hot-replace of three contiguous nodes from the specimen six-node cyclic network of FIG. 1 will now be described.

The system is initially as depicted in FIG. 1 and network traffic is as shown in FIG. 8 (cyclic traffic after discovery is completed). A flow diagram FIG. 25 illustrates the sequence of actions that constitute hot-replace. The operator normally begins the hot-replace process with a software command 2502 to shutdown the nodes to be replaced or serviced while the system is in normal cyclic operation, this controlled, partial shutdown ensures that the machine is brought to a safe condition and a second controller software procedure 2503 ensures the false triggering of error supervisors associated with the nodes that are about to be removed is obviated. The other possible means of beginning the hot-replace process is an accidental shutdown of nodes due to power or cable problems. Selected nodes are then removed 2504, FIG. 2 shows the example system after partial shutdown. Nodes 2, 3 and 4 (elements 104, 105 and 106), as shown in FIG. 1, have been disconnected from the system. Communication to the remaining nodes continues without interruption 2505. Packets from node 5 (107) are now routed over the formerly idle cable between node 5 (107) and the controller (101). This fault recovery action ('self-healing') is a standard feature of SynqNet. FIG. 9 shows the resulting packet schedule—the packets sent by nodes 2, 3 and 4 are now missing from the upstream packet set 901. The controller continues to transmit downstream packets for nodes 2, 3 and 4 (902), even though the respective nodes are missing.

The nodes can then be replaced or serviced, before being re-attached 2506. As shown in the FIG. 13, nodes 2, 3 and 4 (elements 104, 105, and 106) are re-attached to the system with node types, node sequence, and cable lengths identical to the original system. The operator then uses a software command 2507 to activate the re-start phase (re-discovery) of the hot-replace procedure. Next, the controller re-discovers, from its A port, any re-connected nodes 2507, configures them to the original schedule 2507, each node then resumes normal cyclic operation as the flag in the SYNQ packet (SQ in 902), which controls when the network is cyclic, is already set.

The re-discovery process 2507 is essentially the same as discovery process of FIG. 24, except that the initial node count is equal to the number of operational nodes rather than being set to zero in step 2401. Next the controller re-discovers from its A port 2509, again the procedure is similar to that of FIG. 24, this is an optional step as step 2508 may already have discovered nodes up to the original complement of the network.

Prior to this invention, the re-discovery process was not possible, because nodes 2, 3 and 4 would attempt to return STATUS packets asynchronously and thus there was no means of ensuring that the STATUS packets transmitted by nodes 2, 3 and 4 during discovery would not collide with the scheduled, cyclic packets of the remaining cyclic nodes 0, 1 and 5.

Two fundamental innovations allow cyclic and asynchronous communication to co-exist during the re-start phase of the hot-replace procedure.

The first innovation is to re-use packet bandwidth already allocated in the cyclic schedule for the re-discovery process as shown in FIG. 10. The controller uses the original timeslot for the CONTROL packet ("C2" in 1002) for node 2 to send data downstream to node 2. Node 2 will use the previously allocated timeslot to return the STATUS packet ("S2" in 1001) upstream to the controller.

The second innovation is to add a new timer 602, called the Asynchronous Delay Timer, to the network node logic 501 of each node as shown in FIG. 6. When the node is using asynchronous communication, the reception of a valid CONTROL packet will cause the Asynchronous Delay Timer 602 to re-load and count down. When the timer expires, block 603 sends a STATUS packet back to the controller. During the first discovery of the network following power-up or a total system reset, the Asynchronous Delay value is 0 and the Asynchronous Delay Timer has no effect. During the re-start phase of the hot-replace procedure, the controller begins the re-discovery of a node by writing a value to the Asynchronous Delay Timer such that the node will send its respective STATUS packet back to the controller within the respective timeslot of the originally calculated cyclic schedule thereby avoiding any packet collisions. Thus a node that is undergoing re-discovery, and is therefore still communicating asynchronously, can co-exist within the cyclic packet schedule.

It is important to appreciate some further practical details that pertain to the re-discovery process. When a node is undergoing re-discovery (as during discovery) it returns only its STATUS packet (Sx in 701 and 801), specifically it does not send its FEEDBACK packet (Fx in 801) and therefore there is no risk of a collision of FEEDBACK packets. During re-discovery it is essential that the each node's Asynchronous Delay Timer value be loaded correctly, this is assured because firstly the CONTROL packet that sets the delay timer value will be rejected by the node if it has been corrupted and secondly because the controller will continue to attempt to configure this timer until it receives a STATUS packet from said node.

The controller must calculate the nominal Asynchronous Delay value for each re-discovered node based on the known original schedule, known node types, known node internal delays, and known cable lengths. The reason for taking cable lengths into account is that the original schedule for the return packets 801 is arranged to be efficient and is padded with only the minimum idle time between packets; if a node is reconnected with longer cables or a requirement for longer upstream packets then the original schedule can not be respected.

SynqNet nodes are assigned node addresses during configuration and a node that has been re-connected will not initially have an assigned node address, to overcome this difficulty there is a special address that any undiscovered node will receive and this address must be used during node configuration until the node has been assigned its own address.

As described above, the first CONTROL packet sent to node 2 (104 in FIG. 13) when undergoing re-discovery must set the Asynchronous Delay timer value in node 2. After that the various node 2 configuration values are then read and written via the respective CONTROL and STATUS packets. When this process has been completed, node 2 will then be transitioned to cyclic communication but nodes 3 (105) and 4 (106) will remain to be re-discovered thereby resulting in the network set-up of FIG. 14.

With reference to FIG. 14, the re-start process then proceeds to the re-discovery of node 3 (105) from node 2 (104) using the connecting link 111. The re-discovery process for node 3 is exactly the same as for node 2. When node 3 has been re-discovered and transitioned to cyclic communication the network will be as shown in FIG. 15.

With reference to FIG. 15, the re-start process then proceeds to the re-discovery of node 4 (106) from node 3 (105) using the connecting link 112. The re-discovery process is exactly the same as for nodes 2 and 3 but with one important exception; the controller's database of the network set-up prior of FIG. 1 informs the controller that node 4 is the last yet-to-be-re-discovered node from the original network of FIG. 1. Therefore, during the re-discovery of node 4, the controller will ensure that link 113 remains idle and leaves it in this condition when it transitions node 4 to cyclic communication. When node 4 has been re-discovered and transitioned to cyclic communication the network will be as shown in FIG. 3, the packets are transmitted according to the normal cyclic schedule shown in FIG. 8. At this point full sensor/actuator operation of the all of the nodes may be resumed.

Figure 16:
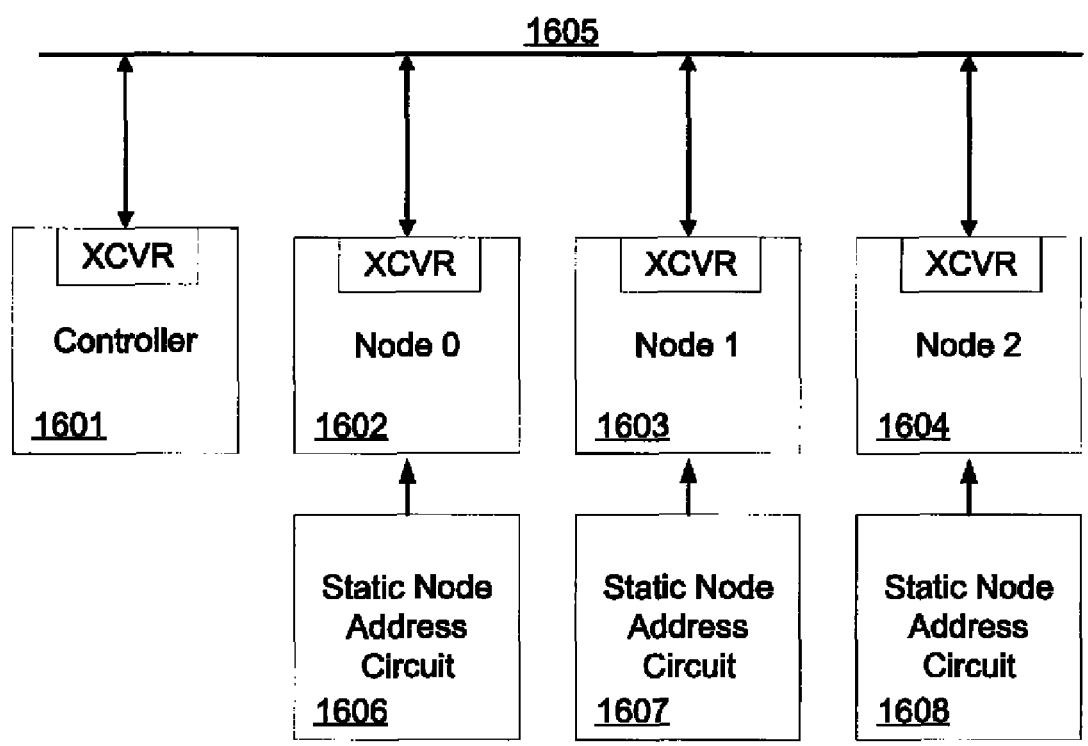

Now turning to an alternate embodiment of a simpler network, the principles of this invention are equally applicable to simpler networks. FIG. 16 shows a half-duplex cyclic network with one controller 1601 and three nodes 1602, 1603, 1604 interconnected on a bus (such as twisted pair cabling) 1605. Each node contains, or is in communication with, a respective device for supplying a network address for each node 1606, 1607, 1608 (Static node address circuit).

Figure 17:
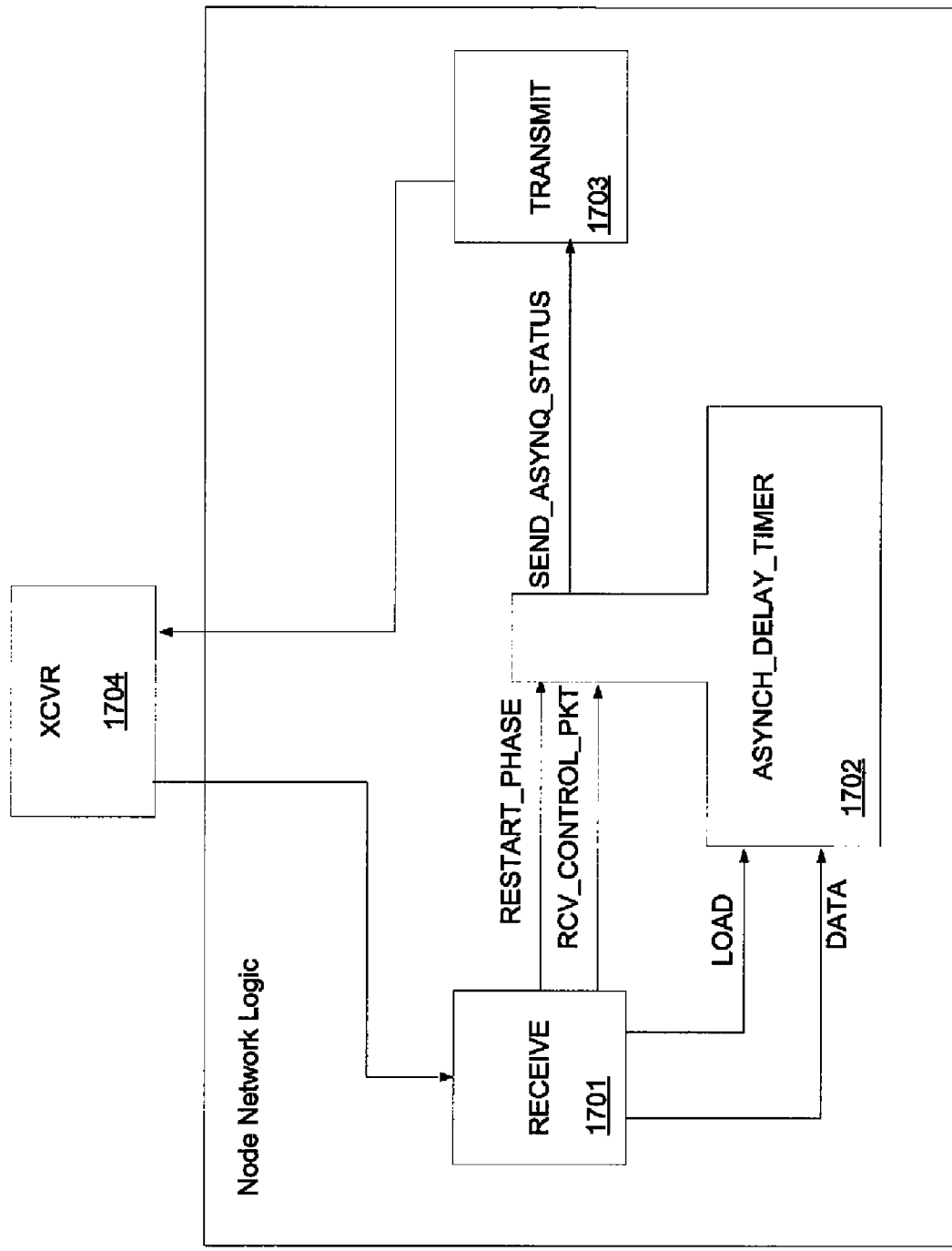
Figure 18:
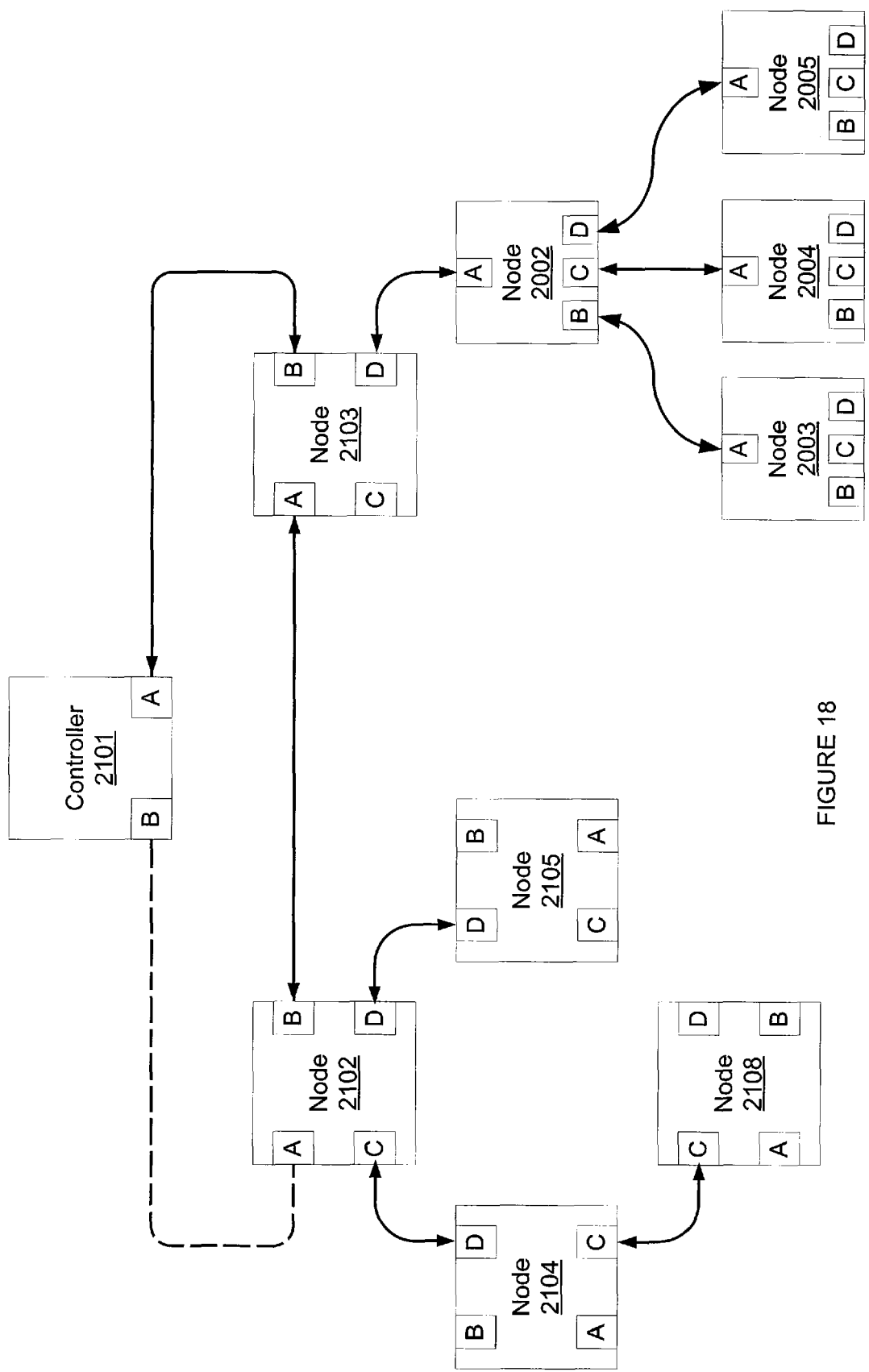

FIG. 17 is a simplified view of the transceiver (combined transmitter and receiver circuit) 1704 and the network node control logic for a half-duplex network showing the asynchronous delay timer. The receive circuit 1701 (Half-duplex network: Node packet receive circuit) detects the reception of the CONTROL packet and activates the Asynchronous Delay Timer 1702, to control the time at which the reply is sent from the transmission control circuit 1703 (Half-duplex network: Node transmit buffer and cyclic packet transmission time control circuit).

Figure 19:
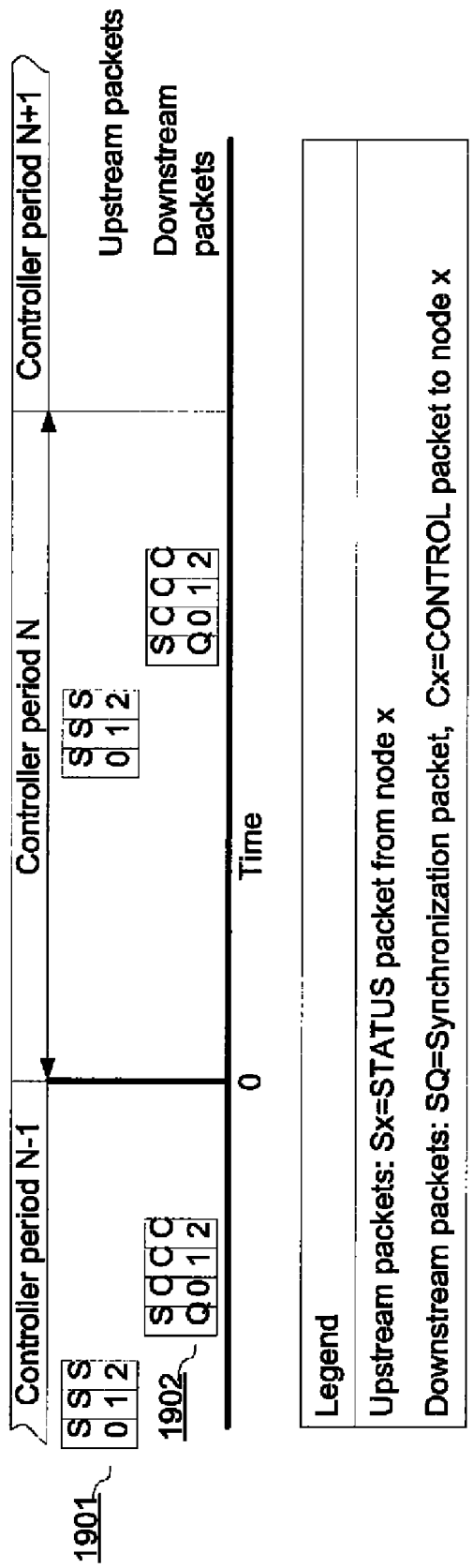

FIG. 19 depicts an exemplary cyclic schedule of packets for the half-duplex network of FIG. 16. In this case there is just one upstream packets per node 1901 (Half-duplex network: Cyclic set of upstream packets from the nodes) and one downstream packet per node 1902 (Half-duplex network: Cyclic set of downstream packets to the nodes) plus a timing packet, SQ.

The main embodiment describes a full-duplex ring. Full-duplex operation yields the best performance in respect of network throughput and allows auto-enumeration (assignment of node addresses according to their position). The ring architecture is the most cost effective and supports self-healing (communication with all remaining nodes in the event that a node or group of contiguous nodes is removed). However the principles of hot-replace are applicable to topologies that use hubs (external or built-in to the nodes) or even use simple bus architectures. Likewise hot-replace can be applied to a half-duplex network.

Consider the network of FIG. 16, a controller 1601 communicates with three nodes 1602, 1603 and 1604. Communication takes place via a single twisted pair cable 1605 using a half-duplex scheme and a physical layer such as RS485 or LVDS. Packets conform to the repeating timetable of FIG. 19, note that the upstream and downstream packets do not overlap. This is a far simpler network than that of the main embodiment but all of the principles of hot-replace still apply. In this network, or any bussed network, when nodes are re-attached, for example if 1602 and 1603 were removed and then re-attached, there is no means of steering a packet to a particular node in the network and thus discovering the nodes in topological order; therefore it is necessary to set the address of each node using a static method (elements 1606, 1607, 1608) such as an EEPROM or hexadecimal switches or an RFID tag or a coded connector. As in the main embodiment, the controller configures a node (both initially and following re-attachment) by sending CONTROL packets 702 and the node responds by sending STATUS packets 701 as in FIG. 7. As in the main embodiment the STATUS packets 701 respect the original cyclic schedule by means of Asynchronous Delay Timer 1702. The implementation of 1702 is the same as that of 602 as depicted in FIG. 6 of the main embodiment. As in the main embodiment, the Asynchronous Delay Timer 1702 is configured by a CONTROL packet. When the re-start procedure has been completed, the re-attached nodes observe the cyclic timing schedule by means of the logic circuitry of 1702.

This bus topology employed in FIG. 16 permits certain simplifications in comparison with the ring topology of the main embodiment: each node has only a single port hence FIG. 17 is simpler than FIG. 6 and since packets can only arrive or be sent from a single port. The re-start procedure is similar to that of the main embodiment but is slightly simplified as the controller does not assign the node addresses.

Hot-replace as implemented by in the present invention is applicable to many cyclic network types. The preferred network types are those in which (a) the network traffic is not disrupted, or is disrupted too briefly to affect the correct operation of the system, when a node is a node is removed or attached, and (b) that a mechanism exists for assigning an address to a node (this can be a dynamic discovery method or it can be a static method such as non-volatile memory or a bank of switches or an RFID tag). For these network types, extending the network's capabilities to support hot-replace of the present invention comprises the following elements: (a) the addition of an Asynchronous Delay Timer circuit, (b) implementation of a mechanism to configure the Asynchronous Delay Timer, and (c) implementation of the hot-replace procedure at the controller.

Figure 20:
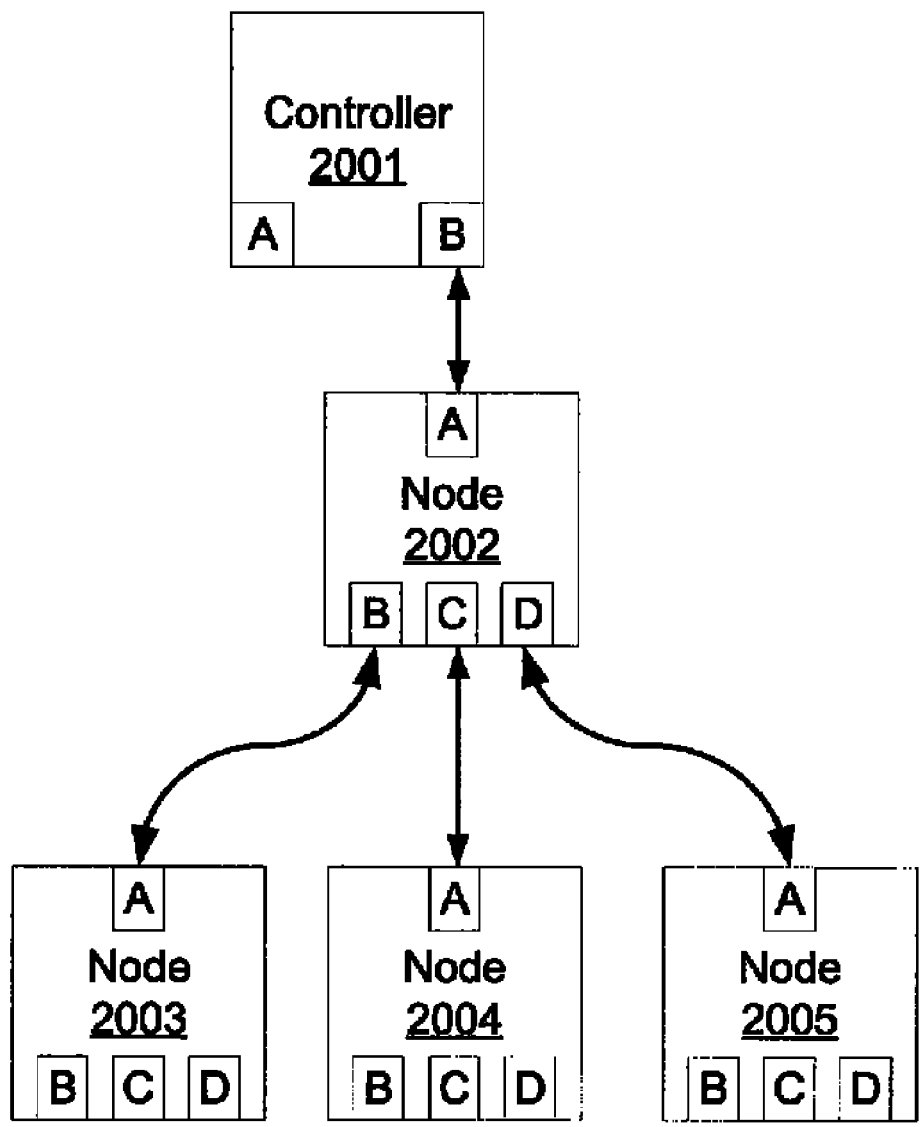
Figure 21:
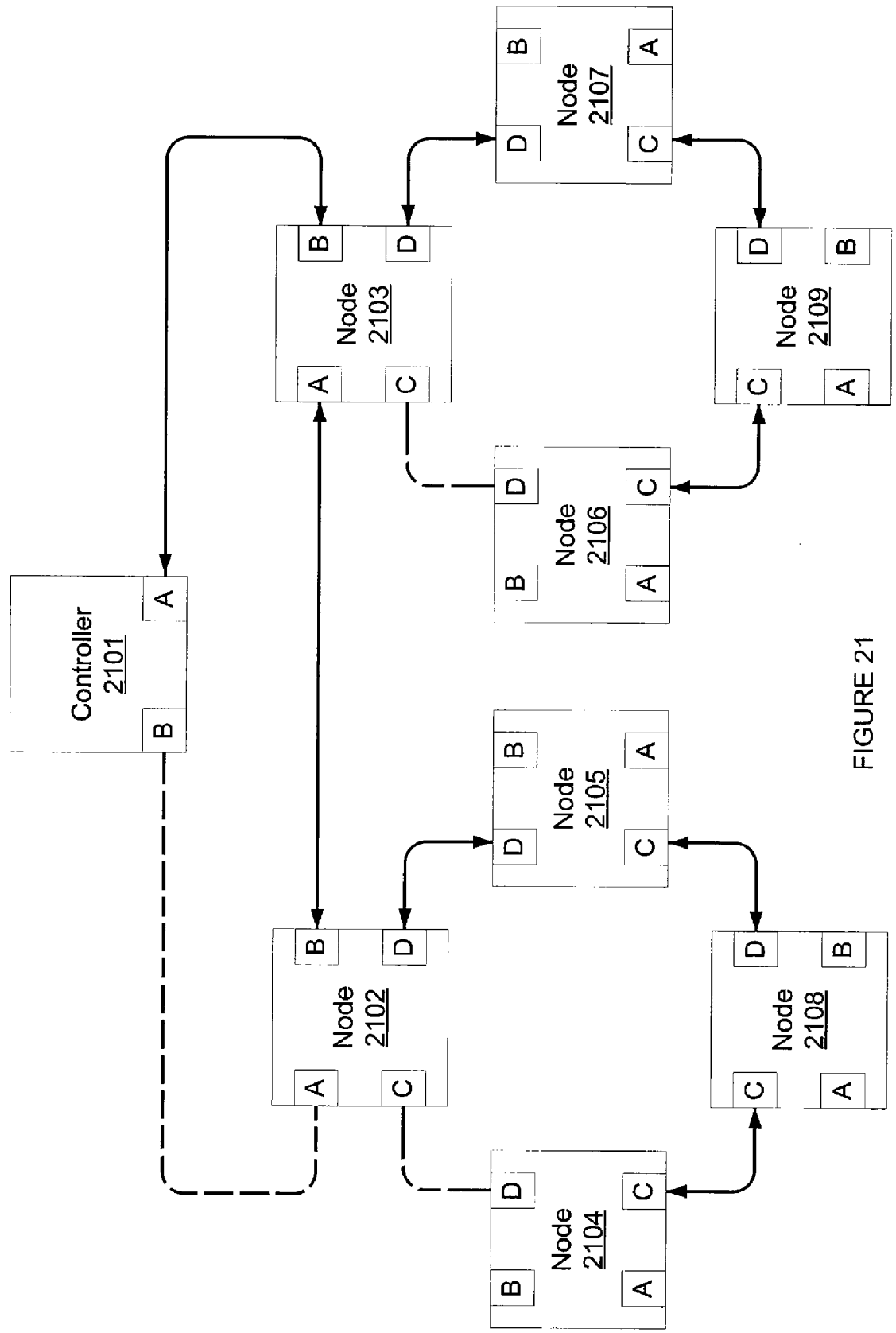

Hot-replace of the present invention is not restricted to a particular topology, as long as the network traffic is not disrupted when a node or group of nodes is removed or attached; thus in addition to the self-healing, full-duplex ring of the main embodiment (FIG. 1), it is alternatively possible to use bus (FIG. 16), line (nodes 0 and 1 in FIG. 2) and tiered topologies such as tree (FIG. 20), ring of rings (FIG. 21) or tree of rings and so forth. Tiered topologies require those nodes forming an intermediate tier to have more than two ports (e.g. 2002 in FIG. 20 or 2102 and 2103 in FIG. 21), and therefore add cost, but offer significant advantages in a system that is commissioned sequentially by branch or sub-ring.

Hot-replace of the present invention is not restricted to a particular network medium. The main embodiment uses the 100-base-T physical layer but other layers including RS485, RS422, LVDS, 10-base-T, 1000-base-T, 100-base-F can be used. A wireless implementation would also be possible. The only requirement is for packets to observe a strictly cyclic schedule.

Hot-replace of the present invention is not restricted to a particular schedule of cyclic packets. The downstream CONTROL and DEMAND packets could be combined. All of the downstream packets for all of the nodes could be combined into a single packet whose contents are selectively used by the nodes. There is also no requirement for a distinct timing packet as any scheduled, downstream packet can be used for timing. Similarly, the STATUS and FEEDBACK packets for each node could be combined. The minimum requirements are that each cycle there must be one downstream packet (either per node or for all nodes) and one upstream packet per node.

Hot-replace of the present invention is not restricted to the replacement of the full set of nodes that have been removed—any contiguous sub-set from the original network that has connectivity to the controller can be used; consider FIG. 13 where it would have alternatively been possible replace node 2 only or node 4 only or nodes 2 and node 4. In a bus network there are no restrictions on the set of nodes that can be selectively re-attached; in FIG. 16 any set that is removed can be partially re-attached without restriction.

Hot-replace of the present invention can be carried out in stages. For example in FIG. 13, the system could be operated with just node 2 'hot-replaced' and then after an interval of time, node 3 could be 'hot-replaced' while the system remains operational (i.e. cyclic communications with nodes carrying out their sensor and actuator duties).

Hot-replace of the present invention can be extended to allow the phased attachment of nodes in addition to those present on the original network. This requires the controller to reserve slots in the repeating timetable for packets sent to and from nodes to be sited on phantom (i.e. not present but allowed for) network segment(s), for example the controller could be configured to communicate with the network of FIG. 1 but without some or even any of the nodes actually being connected. The phantom network segment(s) would be represented to the controller as a data file describing the network plan, i.e. the data file gives the controller the same information that it would have obtaining during network discovery if the nodes and cabling had been present. A second alternate method is to allocate N sets of maximum sized packets for use as new nodes are discovered. Note however that the network cannot be extended beyond the original plan without carrying out a full system reset and re-enumeration. Essentially, the description herein that describes "removed" nodes can also be applicable to "phantom" node(s)/segments(s).

In conclusion, hot-replace capability of the present invention can be implemented on almost any cyclic network so that a networked system for control can partly de-commissioned, partly re-commissioned or extended while operational.

Obviously, numerous modifications and variations of the present invention are possible in light of the above teachings. It is therefore to be understood that within the scope of the appended claims, the invention may be practiced otherwise as specifically described herein.

The invention claimed is:

1. In a cyclic network having a fixed period communication cycle during a cyclic operational state, a method for adding a node into the cyclic network operating in a cyclic operational state without interrupting the synchronous traffic on the cyclic network, comprising:

Operating the cyclic network in a cyclic operational state with a fixed period communication cycle in which upstream and downstream timeslots for data transmission are assigned according to a repeating timetable for a pre-determined complement of nodes in accordance with an original network plan wherein there is at least one unused upstream timeslot that has resulted from a removed node in the cyclic network or from a phantom node assigned in the original network plan but not yet existing on the cyclic network;

While the cyclic network remains operating in the cyclic operational state with the fixed period communication cycle, discovering an added node by sending data comprising a delay value to the added node in a downstream timeslot previously assigned according to the repeating timetable for sending data to the removed or phantom node, said delay value for scheduling a response from the added node to coincide with the unused upstream timeslot for the removed or phantom node, thereby avoiding collisions with the synchronous traffic on the cyclic network;

Receiving the response from the added node in the upstream timeslot previously unused;

Configuring the added node in accordance with a previously calculated configuration; and Commencing cyclic operation of the added node.

2. The method of claim 1 wherein up to N added nodes are discovered sequentially to fill all cyclic timeslots reserved for those N added nodes in the original network plan.

3. The method of claim 2 wherein up to N added nodes are discovered sequentially until a final link is discovered when a response is not received.

4. The method of claim 1 wherein remaining nodes on the network are configured for synchronized transfer of data according to the repeating timetable and the added node is configured according to an original schedule of the removed or phantom node in that timetable.

5. The method of claim 1 wherein the added node comprises substantially a same node type, node sequence, and cable length of the removed or phantom node.

6. The method of claim 1 wherein discovering the added node comprises sending data to an address designed to elicit a response only from a node in an undiscovered state.

7. The method of claim 1 wherein N nodes are first removed from the cyclic network and subsequently up to N are re-attached to the cyclic network.

8. The method of claim 7 wherein the re-attachment of the nodes is accomplished in several stages.

9. The method of claim 1 wherein the delay value for scheduling the response from the added node is used by an asynchronous delay timer in the cyclic network node logic of the added node such that the added node will send its response back within a respective timeslot of an originally calculated cyclic schedule for the removed or phantom node.

10. The method of claim 1 wherein the delay value is calculated based information associated with network schedule, node type, internal node delay, and cable length of one or more nodes that have been previously removed or designated as phantom nodes.

11. The method of claim 1 further comprising sending a set of commands to shutdown one or more nodes prior to removal of said one or more nodes to address safety factors and network errors.

12. The method of claim 1 further comprising self-healing of the cyclic network after removal of one or more nodes.

13. The method of claim 12 further comprising routing traffic on the cyclic network across formerly idle cables as part of said self-healing.

14. The method of claim 1 wherein discovering the added node begins from port A of a controller.

15. The method of claim 1 wherein discovering the added node begins from port B of a controller.

16. The method of claim 1 wherein configuring the added node is in accordance with a configuration for the added node contained in the original network plan.

17. The method of claim 1 wherein discovering an added node continues for all added nodes up to a complement of the original plan of the network.

18. The method of claim 1 wherein configuring the added node is in accordance with an original configuration of a previously removed node or phantom node and comprises assigning the added node a network address of the previously removed node or phantom node.

19. The method of claim 1 wherein the cyclic network operates as a half-duplex cyclic network.

20. The method of claim 1 wherein the cyclic network operates as a full-duplex cyclic network.

21. The method of claim 1 wherein the cyclic network comprises a topology that allows for the network traffic to continue without disruption when a node or group of nodes are removed.

22. The method of claim 1 wherein the network comprises one or more of a ring topology, a bus topology, a line topology, a tree topology, or a hybrid topology.

23. The method of claim 1 wherein the network traffic signaling is based on one or more of RS485, RS422, LVDS, 10-base-T, 100-base-T, 1000-base-T, 100-base-F, or wireless.

24. A non-transitory computer readable medium storing instructions for execution on a computer system, which when executed by a computer system causes the computer system to perform the method recited in claim 1.

25. A motion control system comprising:
a cyclic network having a fixed period communication cycle during a cyclic operational state in which upstream and downstream timeslots for data transmission are assigned according to a repeating timetable for a pre-determined complement of nodes in accordance with an original network plan wherein there is at least one unused upstream timeslot that has resulted from a removed node in the cyclic network or from a phantom node assigned in the original network plan but not yet existing on the cyclic network; and
a central controller and plurality of slave nodes communicating with each other via said cyclic network wherein each of the plurality of slave nodes on the cyclic network comprise a delay timer for scheduling a response to be sent in a upstream timeslot according to a delay value; and
wherein the central controller comprises capability for discovering an added node while the cyclic network remains operating in a cyclic operational state with a fixed period communication cycle by sending data comprising a delay value to the added node in a downstream timeslot previously assigned to the removed or phantom node, said delay value for scheduling a response from the added node to coincide with the unused upstream timeslot previously assigned to the removed or phantom node, thereby avoiding collisions with the synchronous traffic on the cyclic network; for receiving the response from the added node; for configuring the added node in accordance with a previously calculated configuration; and for commencing cyclic operation of the added node.

26. The motion control system of claim 25 wherein the downstream timeslot previously assigned and the upstream timeslot previously assigned correspond to the timeslots of the removed node or phantom node in accordance with the original network plan.

27. A cyclic network comprising:
A fixed period communication cycle for the cyclic network operating in a cyclic operational state;
An original network plan for the cyclic network in which upstream and downstream timeslots for data transmission are assigned according to a repeating timetable for a pre-determined complement of nodes in accordance therewith;
a plurality of nodes on the cyclic network, each comprising a delay timer for scheduling a response to be sent in a upstream timeslot according to a delay value, wherein there is at least one unused upstream timeslot that has resulted from a removed node in the cyclic network or from a phantom node assigned in the original network plan but not yet existing on the cyclic network;
a controller on the network for discovering an added node while the network remains operating in the cyclic operational state with the fixed period communication cycle in which upstream and downstream timeslots for data transmission are assigned according to the repeating timetable by sending data comprising a delay value to the added node in a downstream timeslot previously assigned to the removed or phantom node, said delay value for scheduling a response from the added node to coincide with the unused upstream timeslot previously assigned to the removed or phantom node, thereby avoiding collisions with the synchronous traffic on the cyclic network; for receiving the response from the added node; for configuring the added node in accordance with a previously calculated configuration; and for commencing cyclic operation of the added node, whereby the cyclic network allows for the addition of a node into the cyclic network operating in a cyclic state without interrupting the synchronous traffic of the existing nodes on the cyclic network.

28. The network of claim 26 wherein the unused timeslot corresponds with the removed node or phantom node in accordance with the original network plan.

29. A system for adding a node into a cyclic network, comprising:
Means for operating the cyclic network in a cyclic operational state with a fixed period communication cycle in which upstream and downstream timeslots for data transmission are assigned according to a repeating timetable for a pre-determined complement of nodes in accordance with an original network plan without interrupting the synchronous traffic of on the cyclic network while operating in a cyclic operational state;
means for discovering an added node while the cyclic network remains operating in a cyclic operational state with a fixed period communication cycle in which upstream and downstream timeslots for data transmission are assigned according to a repeating timetable, wherein there is at least one unused upstream timeslot that has resulted from a removed node in the cyclic network or from a phantom node assigned in the original network plan but not yet existing on the cyclic network, by sending data comprising a delay value to the added node in a downstream timeslot previously assigned for sending data to the removed or phantom node, said delay value for scheduling a response from the added node to coincide with the unused upstream timeslot for the removed or phantom node known to be unused, thereby avoiding collisions with the synchronous traffic on the cyclic network;
means for receiving the response from the added node in the upstream timeslot previously unused;
means for configuring the added node in accordance with a previously calculated configuration; and
means for commencing cyclic operation of the added node.

* * * * *